US008545133B2

(12) United States Patent
Fumita et al.

(10) Patent No.: US 8,545,133 B2
(45) Date of Patent: Oct. 1, 2013

(54) FILTER CLOTH TRAVELING TYPE BELT FILTER AND PRODUCTION METHOD OF TONER PARTICLES

(75) Inventors: Hidekazu Fumita, Toride (JP); Yoshinori Tsuji, Mishima (JP); Takeshi Tsujino, Mishima (JP); Minoru Omura, Toride (JP); Satoshi Iki, Tsukubamirai (JP); Naoto Aiko, Koshigaya (JP)

(73) Assignee: Canon Kabushiki Kaisha, Tokyo (JP)

( * ) Notice: Subject to any disclaimer, the term of this patent is extended or adjusted under 35 U.S.C. 154(b) by 583 days.

(21) Appl. No.: 12/395,807

(22) Filed: Mar. 2, 2009

(65) Prior Publication Data

US 2009/0226840 A1 Sep. 10, 2009

(30) Foreign Application Priority Data

Mar. 5, 2008 (JP) ................................ 2008-054895

(51) Int. Cl.
B65G 51/16 (2006.01)
B01D 33/64 (2006.01)
G03G 9/08 (2006.01)

(52) U.S. Cl.
USPC ......... 406/187; 430/137.1; 406/190; 210/783

(58) Field of Classification Search
USPC ............ 430/137.1, 137.15, 137.16; 399/288; 210/783; 406/187, 190
See application file for complete search history.

(56) References Cited

U.S. PATENT DOCUMENTS

| 3,988,235 | A | 10/1976 | Shibata et al. ................ 204/266 |
| 5,702,860 | A | 12/1997 | Koyama et al. ............... 430/137 |
| 7,029,579 | B2 | 4/2006 | Tapp |
| 7,611,816 | B2 | 11/2009 | Tuji et al. |
| 2004/0134863 | A1* | 7/2004 | Tapp ............................. 210/783 |
| 2006/0115764 | A1* | 6/2006 | Malachowski et al. .... 430/137.1 |
| 2008/0241730 | A1 | 10/2008 | Tuji et al. ................. 430/137.15 |

FOREIGN PATENT DOCUMENTS

| CN | 1916774 A | 2/2007 |
| EP | 1 862 205 A1 | 12/2007 |
| JP | 05-265252 | 10/1993 |
| JP | 06-329947 | 11/1994 |
| JP | 09-015904 | 1/1997 |
| JP | 3311417 | 8/2002 |
| JP | 2002-365839 | 12/2002 |
| JP | 2006-297366 | 11/2006 |
| JP | 2007-058201 | 3/2007 |
| JP | 2008112153 A * | 5/2008 |

OTHER PUBLICATIONS

Taiwanese Office Action dated Apr. 24, 2012 in Taiwanese Application No. 098106975.
Chinese Office Action dated Feb. 22, 2012 in Chinese Application No. 200910118397.3.

* cited by examiner

*Primary Examiner* — Jonathan Jelsma
(74) *Attorney, Agent, or Firm* — Fitzpatrick, Cella, Harper and Scinto

(57) ABSTRACT

A production apparatus and a production method of toner particles are provided which efficiently and stably reduce the water content of the wet toner particle cake obtained by separating and washing toner particles from toner particle dispersion in a production apparatus of toner particles granulated in a wet process. A wet toner particle cake 1 formed on a belt filter is aerated and dehydrated with air, and at the same time, sealing units 6 provided on the upstream and downstream sides of the aeration unit 3 can be operated to efficiently seal aeration air.

9 Claims, 12 Drawing Sheets

TONER PARTICLE CAKE TRAVELING DIRECTION

FILTER CLOTH TRAVELING TYPE BELT FILTER AND PRODUCTION METHOD OF TONER PARTICLES

BACKGROUND OF THE INVENTION

1. Field of the Invention

The present invention relates to a filter cloth traveling type belt filter for use in the production of toner particles contained in a toner which is for developing an electrostatic charge latent image in an image forming method such as electrophotography, electrostatic recording method and toner jet method, and a production method of toner particles.

2. Description of the Related Art

Toner particles having a desired particle size are formed in a liquid dispersion medium to obtain a dispersion liquid of toner particles in suspension polymerization method and dissolution suspension method. Then, the toner particles are separated from the dispersion liquid of the toner particles with a separation unit typically represented by a solid-liquid separation apparatus such as a filter apparatus and washed to remove impurities. The cake of the obtained wet toner particles is dried, classified as needed, and then supplemented with predetermined additives to produce a toner (see Japanese Patent Application Laid-Open No. S51-014895).

In emulsion polymerization method, a monomer composition containing a polymerizable monomer, a polymerization initiator, a surfactant, and further containing a cross-linking agent, a chain transfer agent, and the other additives as needed are dispersed in an aqueous medium with a stirrer and subjected to polymerization reaction to obtain emulsified resin particles having a desired particle size. In the meantime, a coloring agent is uniformly microdispersed in an aqueous medium containing a surfactant and associated (aggregated and fused) with the emulsified resin particles to obtain a dispersion liquid of toner particles having a desired particle size.

Then, filtration, washing, drying, classification are performed as in suspension polymerization method and dissolution suspension method to produce a toner (see Japanese Patent Application Laid-Open No. H05-265252).

As for the toner particles granulated in such a wet process, there has been proposed a method including separating toner particles from the dispersion liquid of toner particles, for example, with a belt filter having a filter cloth and a vacuum tray closely contacted with each other, and then washing and drying the toner particles (see Japanese Patent Application Laid-Open No. 2002-365839). According to the method described in Japanese Patent Application Laid-Open No. 2002-365839, toner particles are efficiently separated and washed from the dispersion liquid of toner particles, and thereby a toner having excellent image characteristics can be obtained.

In late years, however, high-definition images comparable to photographs in image quality are required of electrophotographic images due to diversified needs of users. One of the effective approaches to obtain high-definition images in electrophotography is to make small sized toner particles. When this small sizing of particles is performed by crushing, large energy is necessary, which is not preferable. On the other hand, it is easy to make the particles small sized in the wet granulation method. When this small sizing of particles is performed, however, dehydration ability deteriorates at the time of separation of toner particles from the dispersion liquid of the toner particles even when the belt filter mentioned above is used, and the water content of the obtained wet toner particle cake tends to increase. It is assumed that this is resulted from increase in the surface area of the particles per unit volume of a cake formed of wet toner particles. The deterioration in the dehydration ability increases the load in the drying step, which is a post process, and gives thermal damage to the toner particles. Thus, deterioration in image characteristics such as occurrence of photographic fog is resulted.

Accordingly, a solid-liquid separation apparatus as described in Japanese Patent No. 3311417 has been suggested as an apparatus for reducing the water content of the cake.

This apparatus is an apparatus which performs solid-liquid separation and drying by pressurizing a wet toner particle cake formed on a belt filter with a perforated plate and further pressurizing the cake by passing gas through the perforations.

However, the above-mentioned apparatus, when applied to a production method of a toner, only presses a plate on a wet toner particle cake, and therefore, there has been such a problem that the wet toner particles are blown out of the press surface where the wet toner particle cake and the plate are closely contacted when the gas is ejected through the perforations.

In addition, since the ejected gas leaks out of the press surface, it becomes difficult to allow the gas to sufficiently pass through the wet toner particle cake. As a result, there has been such a problem that an increase in the water content remaining in the cake and unevenness of the water content in the cake are caused.

As a solid-liquid separation apparatus which solves these problems, a solid-liquid separation apparatus as described in Japanese Patent Application Laid-Open No. 2006-297366 has been suggested. It is described that this apparatus presses a frame-like or annular sealing member 22 as described in FIGS. 15 and 16 on a tray and a wet toner particle cake 1 supplied on the surface of the tray, thereby preventing the cake from being scattered when a pressurized and aerated filtering is performed and enabling a stable filtering. Here, FIG. 15 is a schematic view of the apparatus which views the pressurization/aeration part from the cake traveling direction, and FIG. 16 is a drawing which views the pressurization/aeration part from below.

When this method is applied as a toner production method, the water content of wet toner particle cake 1 can be reduced, but dehydration is not sufficient in order to meet the high quality requirement of images demanded in late years. Therefore, a production apparatus and a production method which further improve dehydration ability are demanded. In addition, the frame-like or annular sealing member, particularly the sealing member which presses a slope surface of the filtration part, is subjected to shear stress and significantly degraded. Consequently, when continuous operation is performed, the sealing condition of the gas for aeration deteriorates and the dehydration ability deteriorates. Therefore, a decrease in the area of the sealing member which presses the slope surface of the filtration part has been eagerly expected.

In addition, there has been proposed in Japanese Patent Application Laid-Open No. 2007-058201 a production process including performing dehydration by compressed aeration after subjecting a toner particle dispersion liquid to solid-liquid separation. This process enables more dehydrated toner particle cake to be obtained with the use of the most suitable sealing member and operation conditions when dehydration is performed by means of compressed aeration. However, dehydration ability was not yet sufficient for meeting the high quality requirement of images demanded in late years and besides the degradation of a sealing member has not been sufficiently suppressed.

An object of the present invention is to provide a production apparatus and a production method of toner particles which have solved the problems as mentioned above. That is, an object of the present invention is to provide a production apparatus and a production method of toner particles which efficiently reduce the water content of a wet toner particle cake obtained by separating toner particles from a toner particle dispersion liquid and washing the toner particles in a production apparatus and a production method of toner particles granulated in a wet process.

Another object of the present invention is to provide a filter cloth traveling type belt filter for use in the production of toner particles overcoming the problems in the production process which a wet toner particle cake having a high water content brings about and having excellent image characteristics and to provide a production method of the toner particles.

SUMMARY OF THE INVENTION

The present inventors have conducted extensive studies and consequently have found that a water content of a wet toner particle cake can be sufficiently reduced by aerating and dehydrating a cake composed of wet toner particles formed on a belt filter with gas ejected from an aeration unit fixed above a tray while at the same time operating sealing units provided in at least two positions on the upstream and downstream sides of the aeration unit so as efficiently to hermetically seal the aeration air, and thus the present inventors have completed the present invention.

Besides, the present inventors have found that a load in the drying step, which is a post process, can be reduced and thermal damage to the toner particles can be suppressed by reducing the water content of the wet toner particle cake. Furthermore, the present inventors have found that the toner obtained by the present invention exhibits excellent image characteristics and thus completed the present invention.

That is, the present invention has the following characteristics: a filter cloth traveling type belt filter for separating toner particles from a toner particle dispersion liquid by filtration, wherein the filter cloth traveling type belt filter has a constitution in which a filter cloth travels in the upper part of a tray and has a dehydrating apparatus which dehydrates a wet toner particle cake on the filter cloth, the dehydrating apparatus has an aeration unit which aerates and dehydrates the wet toner particle cake obtained by separation by filtration with gas, and a sealing unit supported so that the unit can be advanced to and retreated from the wet toner particle cake, the aeration unit is an aeration unit having a gas discharging part to aerate the wet toner particle cake with gas, the aeration unit is fixed to the tray through a static sealing member, the static sealing member is provided so as to seal both ends of the aeration unit and the tray in the direction orthogonal to the traveling direction of the filter cloth, the sealing unit is a sealing unit having a sealing member, the sealing unit is provided in at least two positions on the upstream and downstream sides of the aeration unit in the traveling direction of the filter cloth, and the wet toner particle cake is pressed with the sealing unit when gas is fed from the aeration unit; a production method of toner particles using a filter cloth traveling type belt filter for separating toner particles from a toner particle dispersion liquid by filtration, wherein the filter cloth traveling type belt filter has a constitution in which a filter cloth travels in the upper part of a tray and has a dehydrating apparatus which dehydrates a wet toner particle cake on the filter cloth, the dehydrating apparatus has an aeration unit which aerates and dehydrates the wet toner particle cake obtained by separation by filtration with gas, and a sealing unit supported so that the unit can be advanced to and retreated from the wet toner particle cake, the aeration unit is an aeration unit having a gas discharging part to aerate the wet toner particle cake with gas, the aeration unit is fixed to the tray through a static sealing member, the static sealing member is provided so as to seal both ends of the aeration unit and the tray in the direction orthogonal to the traveling direction of the filter cloth, the sealing unit is a sealing unit having a sealing member, the sealing unit is provided in at least two positions on the upstream and downstream sides of the aeration unit in the traveling direction of the filter cloth, and the wet toner particle cake is pressed with the sealing unit when gas is fed from the aeration unit.

According to the present invention, the water content of the wet toner particle cake can be sufficiently reduced, and thereby the load in a drying step can be alleviated. In addition, less area of the toner particle cake is pressed during sealing operation in comparison with the conventional apparatus, and thereby the deterioration of the toner particles can be alleviated. As a result, the obtained toner can exhibit excellent performance.

Further features of the present invention will become apparent from the following description of exemplary embodiments with reference to the attached drawings.

DESCRIPTION OF THE EMBODIMENTS

Figure 1:
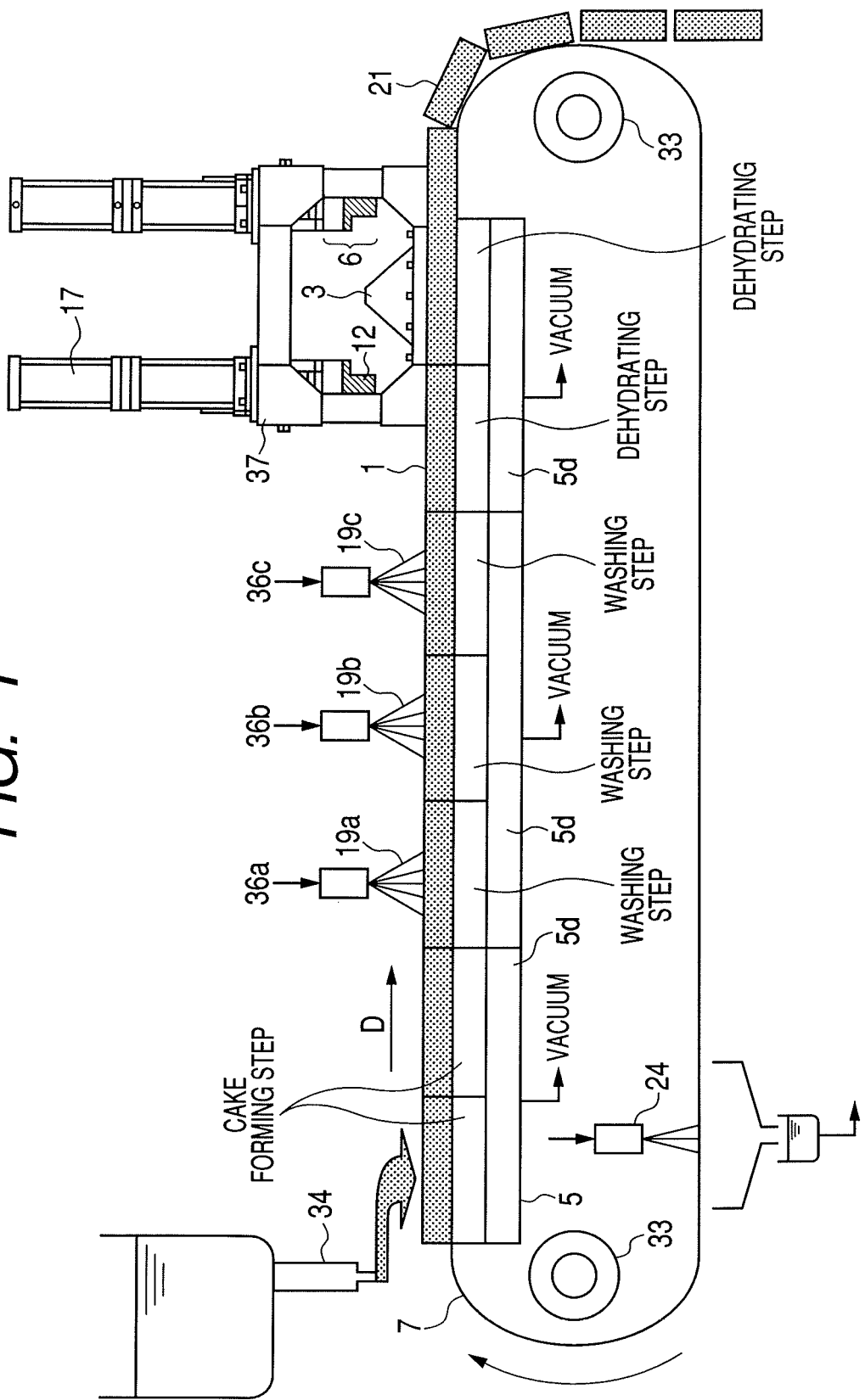
FIG. 1 illustrates a side view of a filter cloth traveling type belt filter including a dehydrating apparatus.

FIG. 1 illustrates a filter cloth traveling type belt filter having a dehydrating apparatus which can be preferably used in the present invention. It should be noted, however, that the dehydrating apparatus usable in the present invention is not limited to this.

Figure 2:
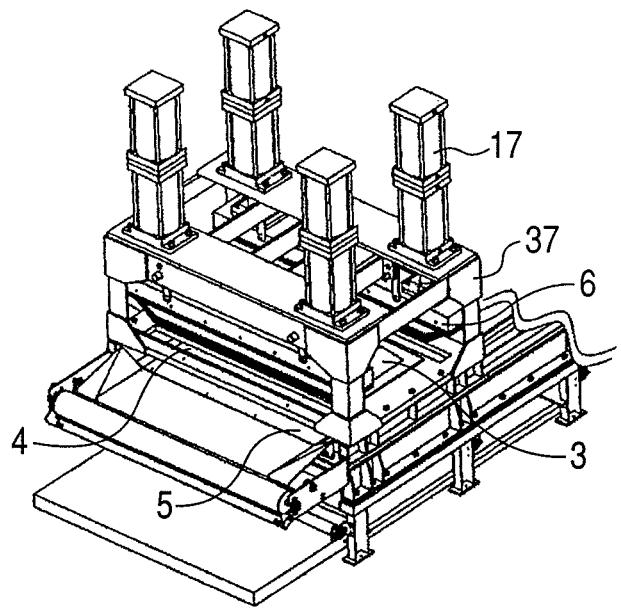
FIG. 2 is a perspective view illustrating a dehydrating apparatus.
Figure 3:
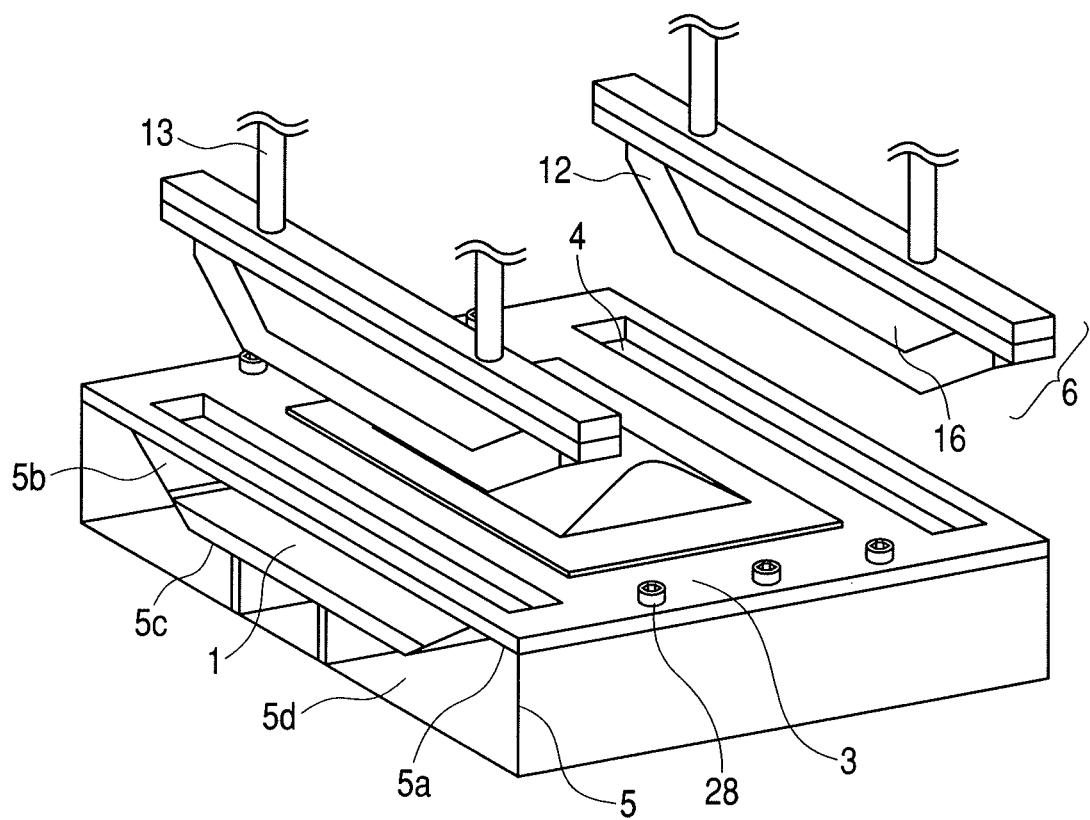
FIG. 3 is a perspective view illustrating a part of the aeration unit, sealing unit/vacuum tray in FIG. 2 and illustrates a perspective view when the sealing unit is lifted.
Figure 4:
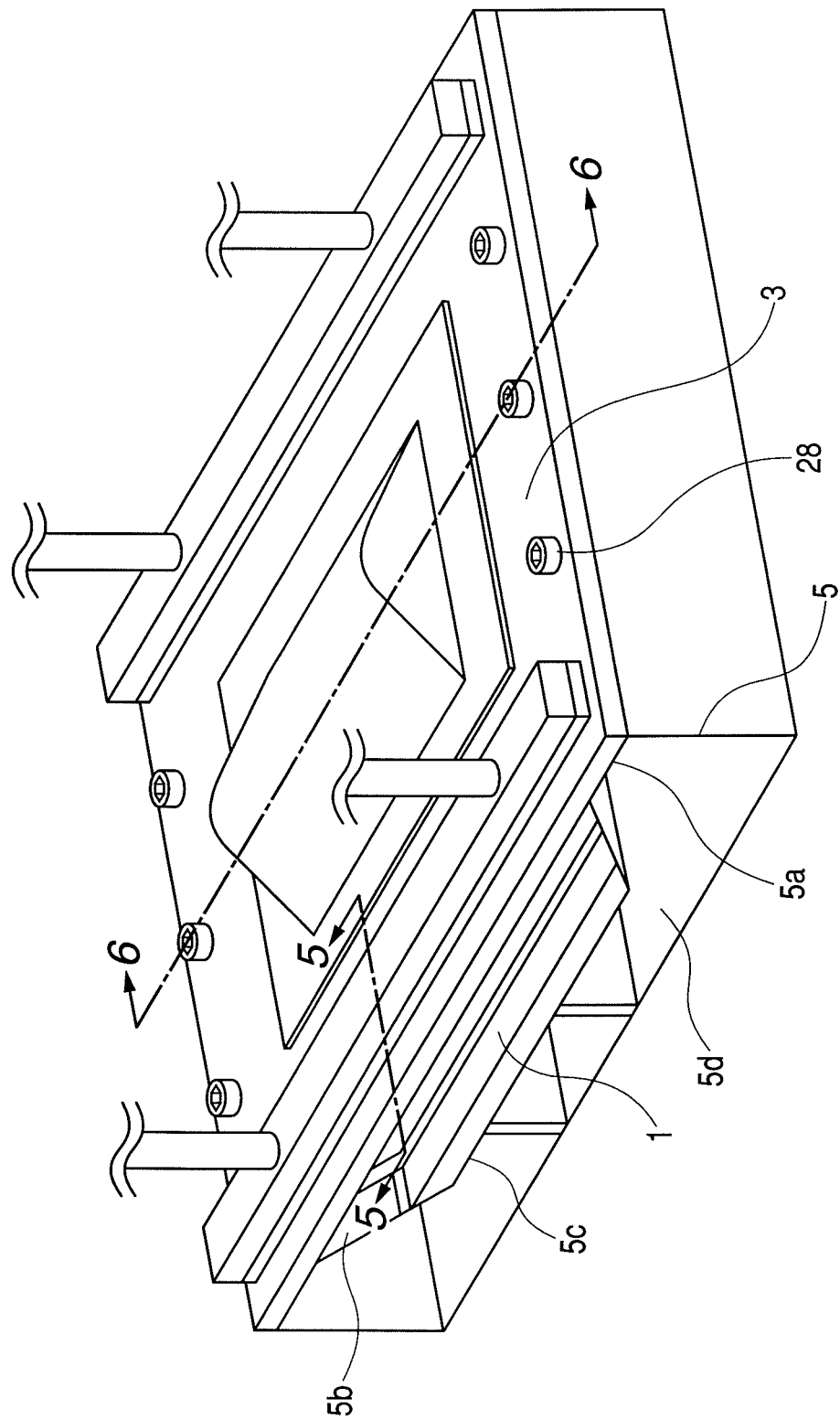
FIG. 4 is a perspective view illustrating a part of the aeration unit, sealing unit/vacuum tray in FIG. 2 and illustrates a perspective view during sealing operation.
Figure 5:
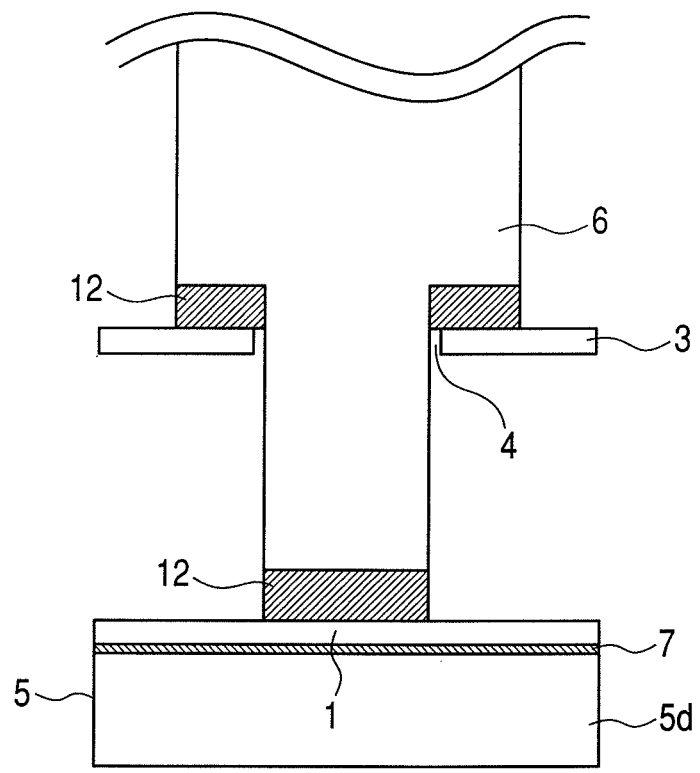
FIG. 5 illustrates a cross sectional view taken along the 5-5 line of FIG. 4.
Figure 6:
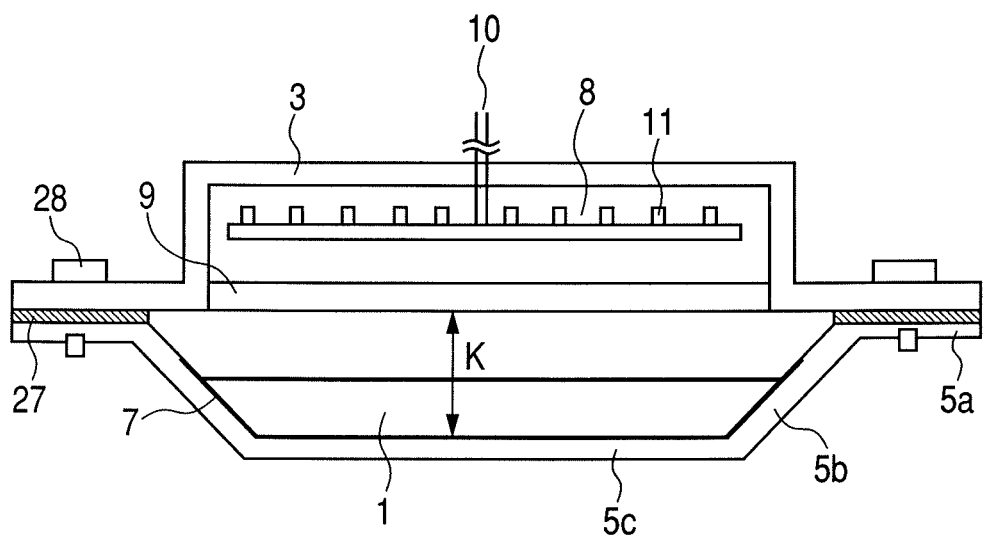
FIG. 6 illustrates a cross sectional view taken along the 6-6 line of FIG. 4.
Figure 7:
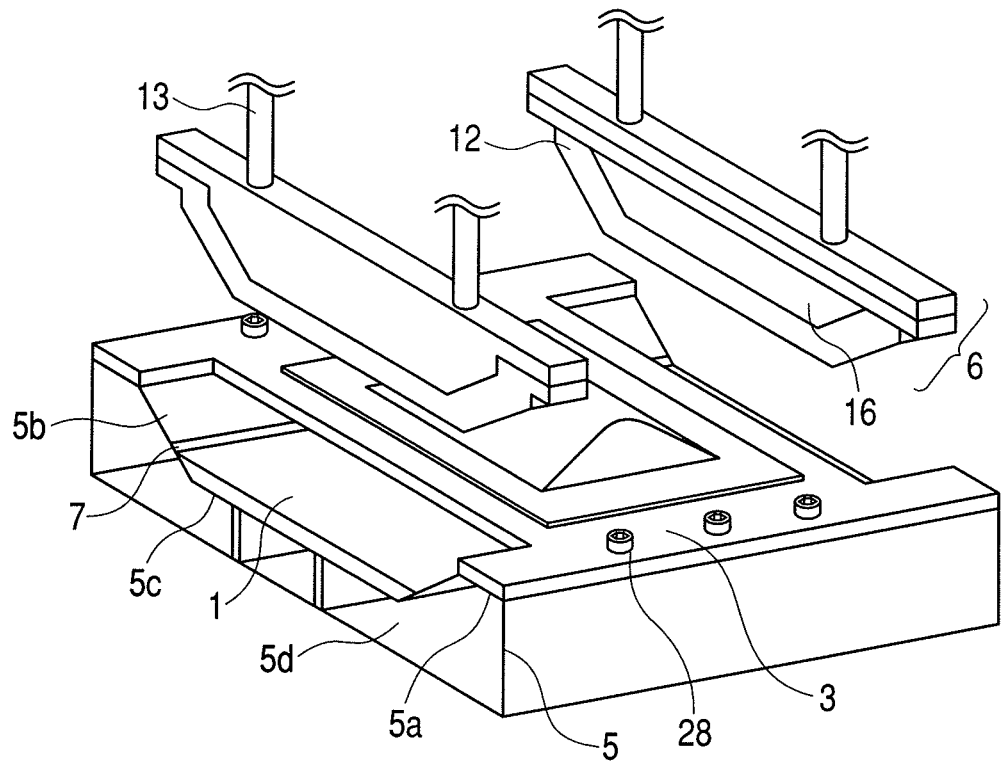
FIG. 7 is a drawing which illustrates one of the examples of the other sealing methods which can be applied to the present invention. This is a perspective view illustrating a part of an aeration unit, a sealing unit/vacuum tray when the sealing unit is lifted.
Figure 8:
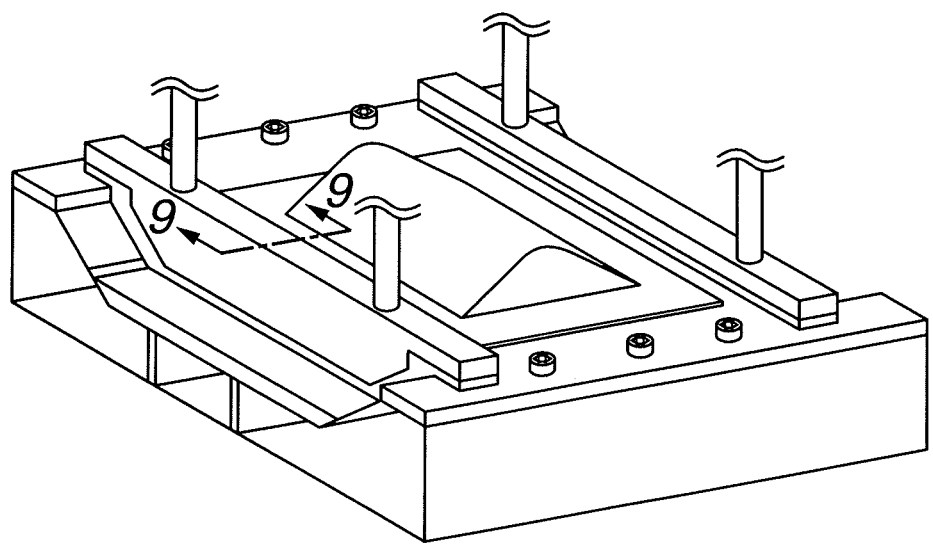
FIG. 8 is a drawing which illustrates one of the examples of the other sealing methods which can be applied to the present invention. This is a perspective view illustrating a part of an aeration unit, sealing unit/vacuum tray during sealing operation.
Figure 10:
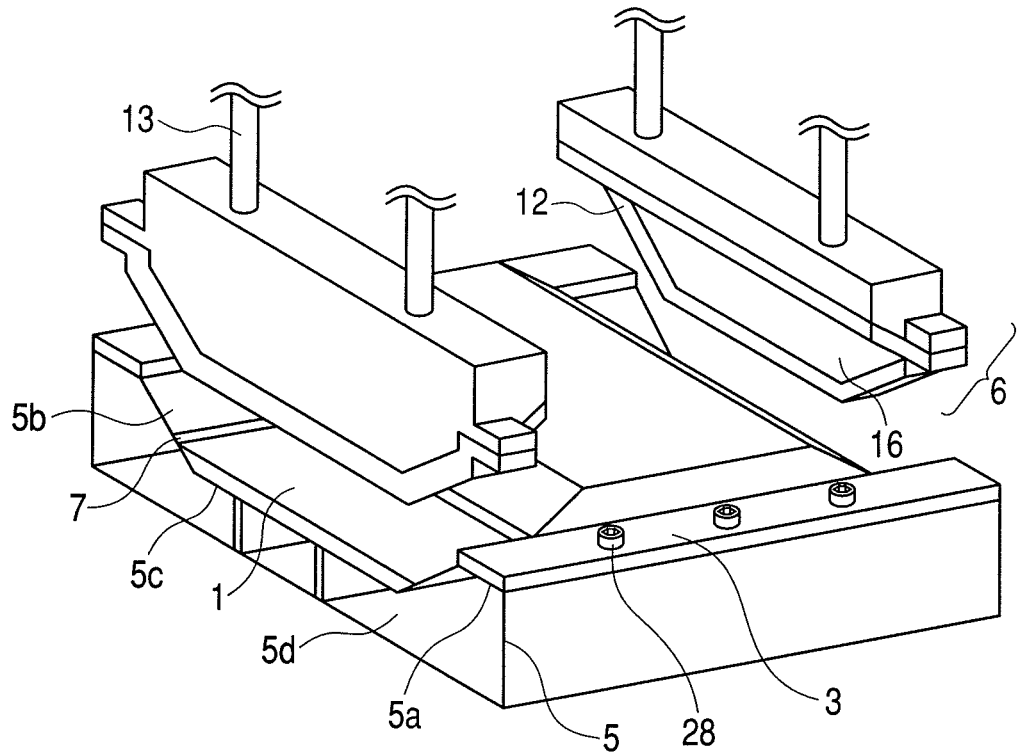
FIG. 10 is a drawing which illustrates one of the examples of the other sealing methods which can be applied to the present invention. This is a perspective view illustrating a part of an aeration unit, sealing unit/vacuum tray when the sealing unit is lifted.
Figure 11:
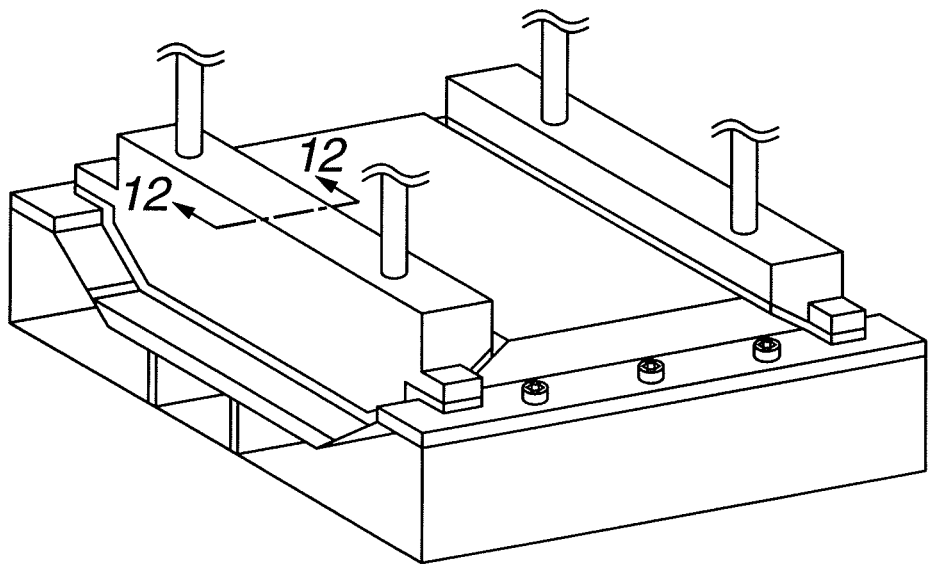
FIG. 11 is a drawing which illustrates one of the examples of the other sealing methods which can be applied to the present invention. This is a perspective view illustrating a part of an aeration unit, sealing unit/vacuum tray during sealing operation.

FIG. 2 is a whole perspective view of a dehydrating apparatus in the dehydrating step. FIG. 2 does not illustrate a filter cloth and a toner particle cake. FIGS. 3 and 4 are perspective views illustrating a part of the aeration unit, sealing unit and vacuum tray in FIG. 2 and are views of the wet toner particle cake during processing. FIG. 3 is a view when the sealing unit is lifted whereas FIG. 4 is a view when the sealing unit is lowered. FIG. 5 is a cross sectional view taken along the 5-5 line of FIG. 4 and FIG. 6 is a cross sectional view taken along the 6-6 line of FIG. 4. FIGS. 7, 8, 10 and 11 are perspective views illustrating a part of the aeration unit, sealing unit and vacuum tray illustrating another sealing method which can be applied to the present invention and are views of the wet toner particle cake during processing. FIGS. 7 and 10 are views when the sealing unit is lifted whereas FIGS. 8 and 11 are views when the sealing unit is lowered.

Figure 9:
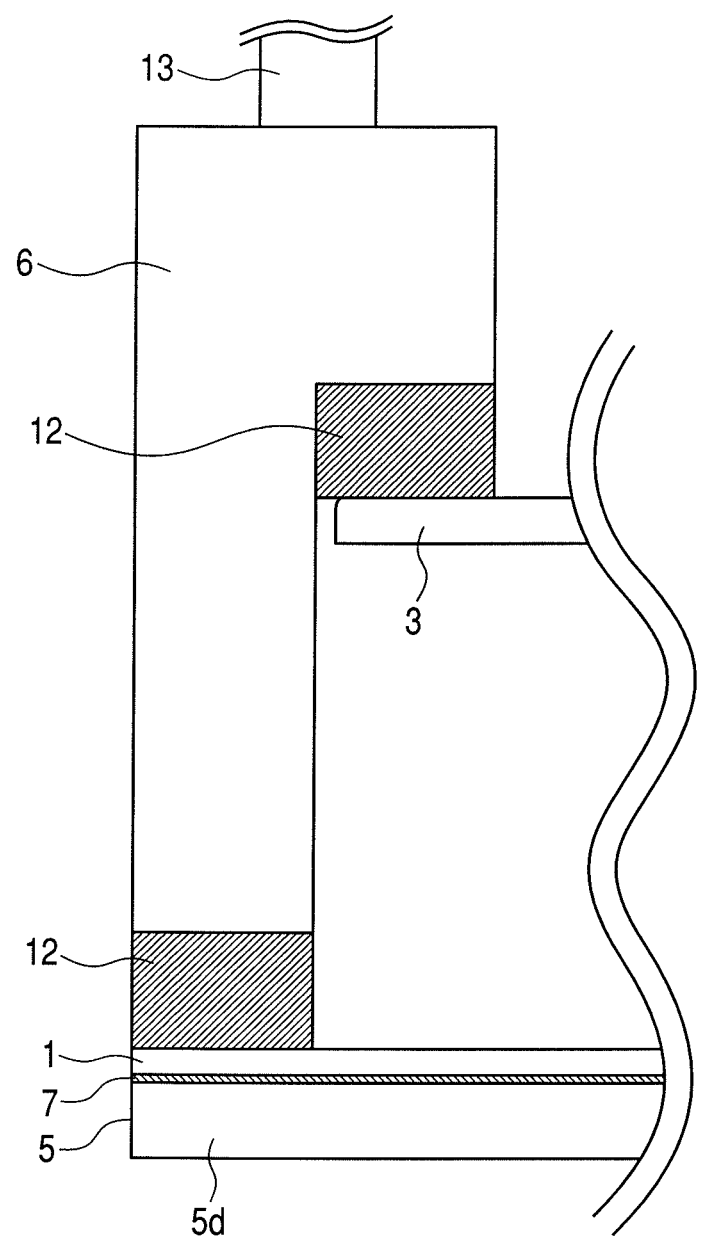
FIG. 9 illustrates a cross sectional view taken along the 9-9 line of FIG. 8.
Figure 12:
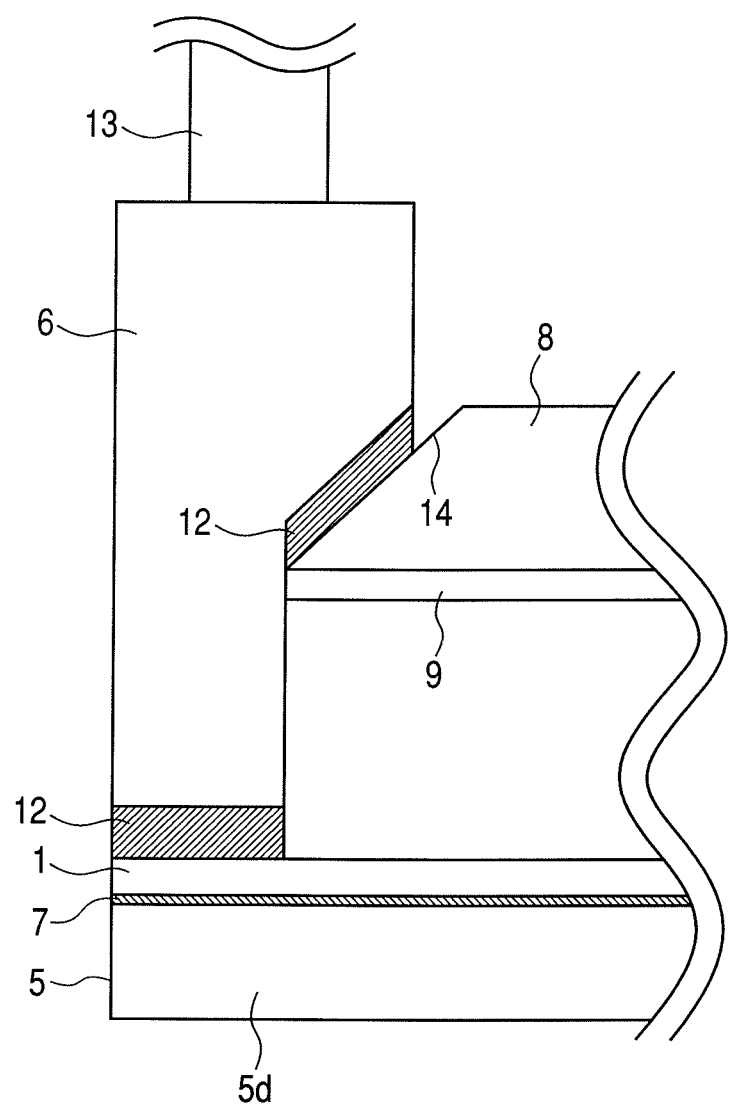
FIG. 12 illustrates a cross sectional view taken along the 12-12 line of FIG. 11.

FIG. 9 is a cross sectional view taken along 9-9 line of FIG. 8 and FIG. 12 is a cross sectional view taken along the 12-12 line of FIG. 11.

Figure 13:
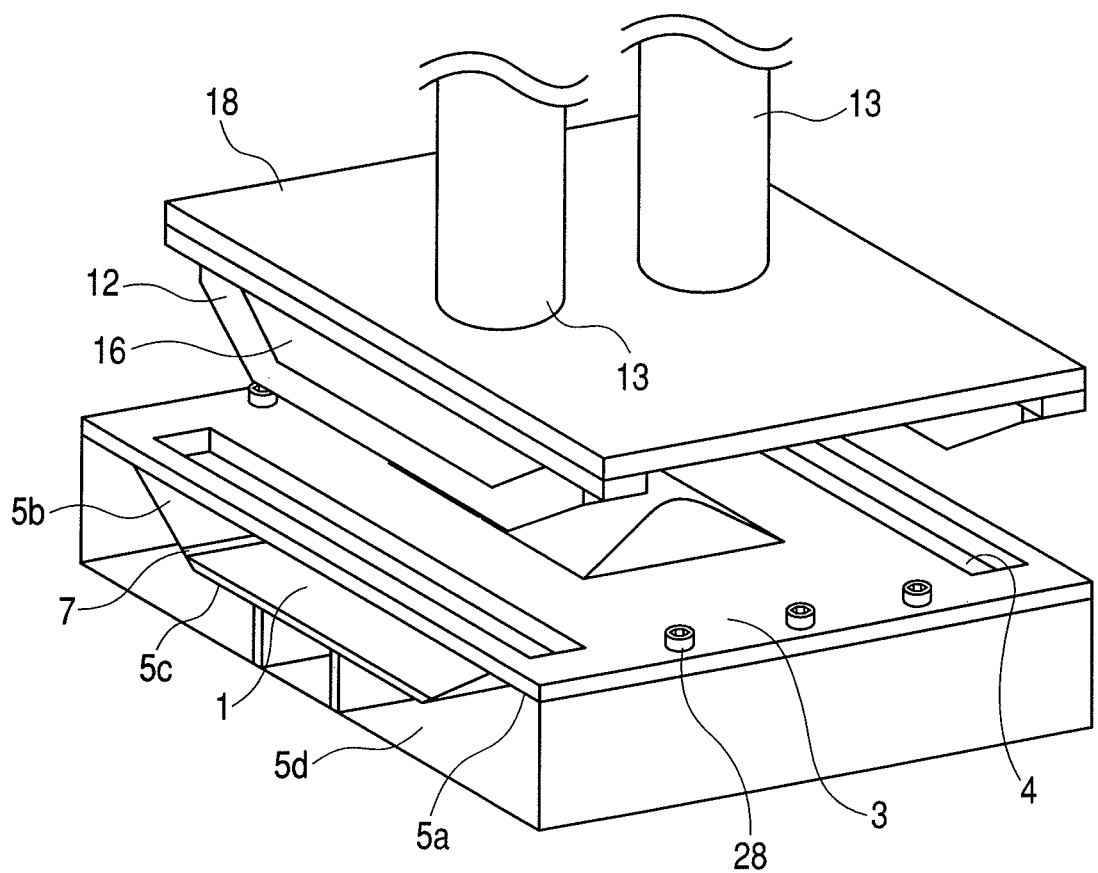
FIG. 13 is a perspective view which illustrates one of the examples of the other sealing unit operation systems which can be applied to the present invention.

FIG. 13 is a perspective view of another sealing unit operation system which can be applied to the present invention.

Figure 14:
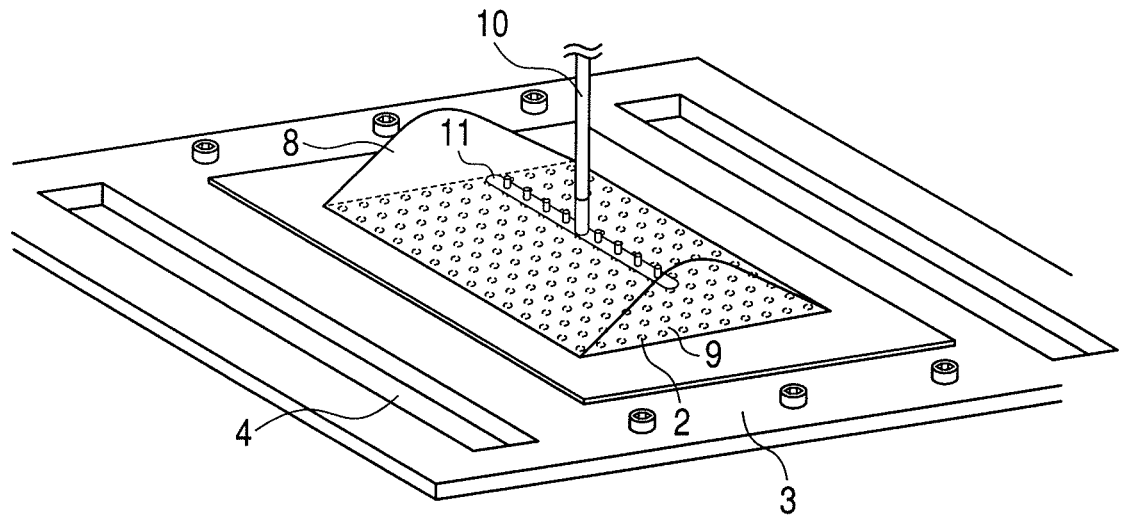
FIG. 14 is a perspective view of an aeration unit of the dehydrating apparatus illustrated in FIG. 2, and this is a perspective view which sights in the inside thereof.

FIG. 14 is a perspective view of an aeration unit of the dehydrating apparatus illustrated in FIG. 2, which sees through the inside thereof.

Figure 17:
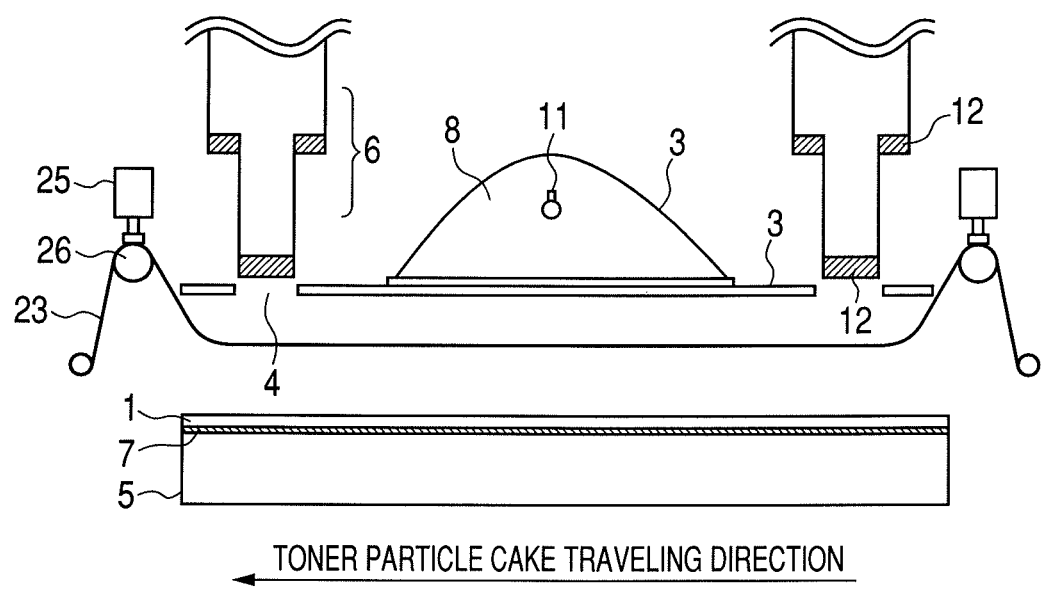
FIG. 17 is a view illustrating a filter cloth provided between a sealing unit which can be applied to the present invention and a wet toner particle cake, and illustrates a view when the sealing unit is lifted.
Figure 18:
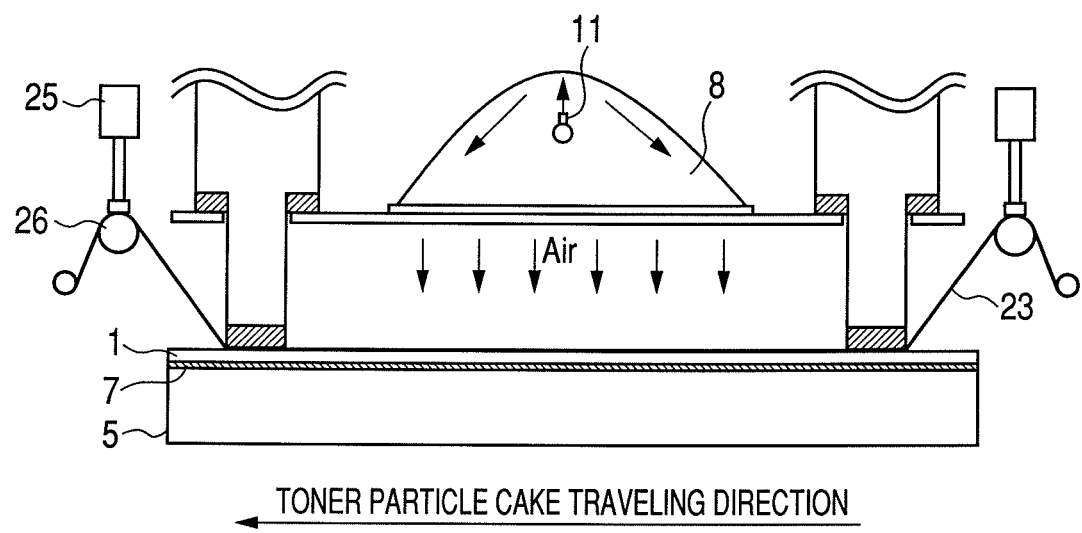
FIG. 18 is a view illustrating a filter cloth provided between a sealing unit which can be applied to the present invention and a wet toner particle cake, and illustrates a view when the sealing unit is lowered.

FIG. 17 is a side cross sectional view of the dehydrating apparatus. This is a view illustrating a filter cloth provided between a sealing unit and a wet toner particle cake, when the sealing unit is lifted. FIG. 18 is a side cross sectional view of the dehydrating apparatus. This is a view illustrating a filter cloth provided between a sealing unit and a wet toner particle cake, when the sealing unit is lowered.

In the following, preferable embodiments of the production apparatus and the production method of toner particles of the present invention are described with the use of the drawings.

The belt filter illustrated in FIG. 1 has a filter cloth 7 fitted over and around rolls 33 and continuously or intermittently driven to travel in the direction of arrow D by the rotation of the rolls 33. Preferably, the filter cloth is intermittently driven to travel as described later. The filter cloth travels in the upper part of a vacuum tray 5, and fixed type vacuum tray lower chamber(s) 5d integrated or divided into a plural number of chambers is/are provided in the lower part of vacuum tray 5. A vacuum pump (not illustrated) is connected to this vacuum tray lower chamber 5d, forming a structure which can be drawn to vacuum via the vacuum tray lower chamber 5d from below the filter cloth 7. Here, the horizontal part 5c of the vacuum tray and the slope part 5b of the vacuum tray have perforations (not illustrated).

Various dispersion stabilizing agents exist on the surface of the toner particles of the toner particle dispersion liquid obtained by wet granulation method. Pre-treatment suitable for respective wet granulation methods is performed to dissolve or to remove these dispersion stabilizing agents. The toner particle dispersion liquid is supplied onto the filter cloth 7 through a liquid sending unit 34 after having been subjected to the pre-treatment, and filtered and hydrated in a cake forming step by depressurization.

For example, in the case of wet granulation method by suspension polymerization method, acid treatment is performed to dissolve the dispersant existing on the surface of the toner particle, but this step tends to be accompanied by a foaming phenomenon. This foaming phenomenon might adversely affect the filtration and separation in the cake forming step and reduce efficiency. Therefore, when acid treatment is performed, it is preferable to select an apparatus and a method to suppress foaming.

The filtrate obtained by separation by filtration is collected to the lower chamber 5d of the vacuum tray, and sent to a filtrate tank not illustrated via a filtrate pipe not illustrated. It is preferable that the filter cloth 7 is driven to travel intermittently in order to allow the vacuum action to act effectively and that the filter cloth 7 and the vacuum tray 5 are not in sliding contact, but in close contact, with each other while the vacuum action is operated. When continuously driven, the filter cloth 7 tends to have troubles in close contact with the vacuum tray 5 and it is difficult to obtain high degree of vacuum. When high degree of vacuum is not obtained, filtration efficiency and separation efficiency decrease, and it becomes difficult to effectively separate toner particles from a liquid dispersive medium.

The filtered and separated toner particle cake and the filter cloth 7 before washing are sent in the direction of arrow D by rotation of rolls 33, and sent to a washing step area provided with one or two or more of cake washing apparatuses 36 in the upper part thereof. One or two or more kinds of cleaning fluids are dispersed from the cake washing apparatus 36 as needed to wash and remove a soluble or dispersive substances on the surface of the toner particle cake before washing. Then, these substances are drained along with the filtrate collected to the lower chamber 5d of the vacuum tray. It is preferable that the filter cloth 7 and the vacuum tray 5 are not in sliding contact, but in close contact, with each other at this time to obtain high degree of vacuum as mentioned above.

Then, the wet toner particle cake 1 (a cake is referred to as a wet toner particle cake in the present invention until it passes through a washing step and through a dehydrating apparatus, and a cake pressed with a sealing unit on the downstream side is also a wet toner particle cake) and the filter cloth 7 are sent to a dehydrating step area in the direction of an arrow D by rotation of rolls 33. It is preferable that the dehydrating step area is divided into two or more spans (a view of a dehydrating step area with two spans is drawn in FIG. 1) as illustrated in FIG. 1, and it is preferable that at least one span of the dehydrating apparatus 37 according to the present invention is provided in the span downstream in the direction of arrow D. Dehydration action works effectively by squeezing water, which has not been squeezed out in the previous spans, in the last span by providing a dehydrating apparatus 37 on the most downstream side as illustrated.

The dehydrating apparatus has an aeration unit 3 fixed in the upper part of the vacuum tray 5 as illustrated in FIGS. 2, 3 and 4.

The aeration unit 3 has a gas discharging part 9 having perforations 2 and an air buffer room 8 for accumulating gas for aeration thereabove as illustrated in FIG. 14. The aeration unit 3 is constituted so that both the ends thereof can be fixed on both the ends of the vacuum tray 5 in the direction orthogonal to the traveling direction of the filter cloth. While the air introduced through the air inflow path 10 is discharged upward from nozzles 11 and accumulated in the air buffer room 8, the gas is ejected from perforations 2 toward the cake. Here, the upper part of the air buffer room 8 is in a triangle shape, and the air discharged upward goes along the wall surface of the air buffer room 8 and is so spouted as to widen downward. This system reduces short pass of the aeration air and can uniformly dehydrate the wet toner particle cake 1. However, there is no particular limitation on the shape of the air buffer room 8 as long as it has such a constitution as to enable the air flowed into to the aeration unit 3 to be accumulated in the air buffer room 8.

As for the constitution of the gas discharging part 9, perforations 2 may be provided, for example, by penetrating a suitable iron plate or a plate made of polypropylene by punching.

As for the fixing method of the aeration unit 3, it is preferably fixed with bolts 28 through a static sealing member 27 as illustrated in FIG. 6. A rubber packing is preferably used as the static sealing member 27 but it is not particularly limited as long as the air for aeration does not leak from the fixing parts.

Since the aeration surface is fixed to the end 5a of the vacuum tray as described above, the air for aeration scarcely leaks from the sides (the ends in the direction orthogonal to the traveling direction of the cake). In addition, the aeration surface is rarely tilted by the influence of the condition of the cake as compared with the case where an aeration unit is driven up and down, and variation of dehydration performance due to deterioration in the precision of sealing the gas for aeration can be reduced. It is more preferable to fix the aeration unit 3 from the viewpoint of stability of sealing performance and dehydration performance.

Besides, in the case where the aeration unit is driven up and down, the area of the part to be driven up and down increases when the apparatus is scaled up and may lead to an increase in production energy due to the complication and upsizing of the lifting and lowering apparatus. It is more preferable to fix the aeration unit in order to solve this problem.

The sealing unit 6 has a sealing member 12 supported by a sealing member support 16 and is provided so that it can be advanced toward or retreated from the wet toner particle cake. Furthermore, the sealing unit 6 is configured to be provided in two positions on the upstream and downstream sides of the aeration unit 3 in the traveling direction of the filter cloth of the filter cloth traveling type belt filter as illustrated in FIGS. 2, 3 and 4.

It is preferable in the present invention that the sealing unit 6 is provided in only two positions of the upstream and the downstream sides to control the area of the sealing region. This constitution can suppress an increase in the load of the driving apparatus due to the increase of the area to be sealed. In addition, this constitution can reduce the area to be pressed on the slope part 5b of the vacuum tray where the sealing member 12 significantly deteriorates, to thereby keep high sealing characteristics of the gas for aeration and effective dehydration performance in continuous operation. Furthermore, deterioration in the toner particles can be alleviated since the area where the sealing member 12 presses the toner particle cake is reduced.

Properties of the toner particle cake are greatly different between before and after the dehydrating apparatus since they are a non-dehydrated cake and a dehydrated cake. In particular, a dehydrated toner particle cake 21 which has passed through the dehydrating apparatus and has a sufficiently reduced water content is fragile and easy to collapse and therefore, in some cases, the cake needs to be pressed more strongly with the sealing member 12 of the sealing unit 6 on the downstream side than on the upstream side depending on the kind thereof. In the present invention in which the sealing part is separated, even such a problem can be solved by setting the pressure to press the sealing member on the downstream side to a higher level or by setting the compressibility of the sealing member to a higher level.

In the present invention, the wet toner particle cake 1 is aerated and dried with gas by performing sealing. Specifically, two sealing units 6 are lowered as illustrated in FIGS. 3, 4 and 5. The sealing members 12 provided in the sealing units 6 are pressed onto the filter cloth 7, the slope part 5b of the tray and the wet toner particle cake 1 to perform sealing, and dehydration and aeration are performed.

It is necessary at this time to suppress leakage of the aeration gas from between the aeration unit 3 and the sealing unit 6. As a method for suppressing the leakage, the sealing members 12 provided in the sealing units 6 can be pressed onto the aeration unit 3. Sealing between the aeration unit 3 and the sealing units 6 is achieved by lowering the sealing units 6 into the sealing unit insertion openings 4 provided in the aeration unit 3 in the vertical direction as illustrated in FIGS. 3 and 4. The region around the sealing unit insertion opening 4 is pressed with the sealing member 12 at this time as illustrated in FIG. 5, thereby effectively suppressing the leakage of the aeration gas.

Next, the other sealing methods which can be applied to the present invention are described. Sealing between the aeration unit 3 and the sealing units 6 can be achieved by pressing the sealing units 6 in an L-letter shape onto the end parts of the aeration unit as illustrated in FIGS. 7, 8 and 9.

Furthermore, sealing between the aeration unit 3 and the sealing units 6 can be achieved by pressing the sealing members 12 onto the slope surfaces 14 of the aeration unit as illustrated in FIGS. 10, 11 and 12. The sealing unit 6 has a sloped shape so as to fit the slope 14 of the aeration unit as illustrated in FIG. 12.

Three kinds of methods for performing sealing between the aeration unit 3 and the sealing unit 6 which can be applied to the present invention have been described above, but the methods are not limited to these. The shapes of the sealing unit 6 and the sealing member 12 of the sealing unit 6 are appropriately selected so that they can press the slope part 5b of the vacuum tray, the wet toner particle cake 1 and the aeration unit 3 sufficiently.

The gas ejected from the gas discharging part 9 is accumulated in the space formed by being surrounded by the sealing unit 6, the aeration unit 3, the wet toner particle cake 1 and the static sealing member when the sealing unit 6 is lowered (at the time of sealing). Subsequently, the accumulated gas passes through the wet toner particle cake 1, thereby pushing out the water present among the toner particles and being discharged to the vacuum line.

In the present invention, the aeration unit 3 is preferably fixed so that K is within $15 \leq K \leq 400$ wherein K (mm) is the distance between the lower surface of the gas discharging part 9 and the upper surface of the horizontal level 5c of the vacuum tray below the filter cloth 7 (see FIG. 6) The gas for aeration can achieve dehydration without collapsing the cake of the wet toner particles when K is within the range mentioned above. In the case of K<15, deviating from the range mentioned above, the gas for aeration violently moves on the surface of toner particle cake and results in dehydration unevenness due to the collapse of the toner particle cake, and thus this case is not preferable. In the case of 400<K, the area to seal the air increases to lead to deterioration in the accuracy of the sealing as well as an increase in the load on the apparatus, and thus this case is not preferable.

For the sealing member 12 used in the present invention, materials having strength and durability are needed so as not to deteriorate in the operation where the member is repeatedly depressed. Therefore, the material of the sealing member 12 is preferably a polymer selected from the group consisting of polyisoprene, butadiene-styrene copolymer, polybutadiene, polychloroprene, ethylene-propylene copolymer, butadiene acrylonitrile copolymer, acrylic ester copolymer, polyurethane, organic polysiloxane, polyethylene and polypropylene.

It is also necessary that the sealing member 12 used in the present invention should achieve sufficient sealing when an uneven wet toner particle cake 1 is produced. Therefore, the sealing member is required to be of a material with elasticity capable of fitting the convex and concave surface of the wet toner particle cake 1. On this account, the polymeric structure is preferably a rubber-like elastic body, and more preferably a rubber-like elastic body having a foam structure, that is, the so-called rubber sponge.

Examples of the rubber sponge applicable to the present invention include an NR sponge, an SBR sponge, a BR sponge, a CR sponge, an EPDM sponge, a BR sponge, an NBR sponge, an acrylic elastomer sponge, a silicone rubber sponge and a polyurethane rubber sponge. In addition, the above-mentioned polymer may be a foam such as polyurethane foam, polyethylene foam and polypropylene foam.

Furthermore, any foam structure selected from the group consisting of an independent cell structure, an open cell structure and a semi-open cell structure can be used as the above-mentioned rubber sponge, polyurethane foam, polyethylene foam and polypropylene foam. The foam structure has an influence on performance such as sealing properties (hardness and repulsion) of the aeration air required for the sealing member 12 and strength (residual compression strain). Therefore, the foam structure can be appropriately selected according to use or depending on some performance to which importance is attached. The semi-open cell structure is preferably used particularly in the present invention as a structure having the above-mentioned performances in a good balance.

In addition, it is preferable that the surface hardness F° of the sealing member 12 satisfies 5≦F≦50. In the case of 5>F, the durability of the member is poor, and sealing properties deteriorate. In the case of 50<F, when a wet toner particle cake 1 with a convex and concave surface is formed, the sealing member 12 does not fit the convex and concave surface and cannot seal the gas for aeration and accordingly this case is not preferable. Although there are various kinds of methods for the measurement of the surface hardness of the sealing member 12, the surface hardness in the present invention is determined with an Asker rubber hardness tester (model C conforming to JIS K7312) in which a press needle with a pre-determined shape is pushed against the surface of a sample by the power of a spring, thereby causing deformation and the hardness is measured based on the "penetration depth into the sample" at the position where the resistance of the sample and the force of the spring are balanced.

Furthermore, the compressibility of the sealing member 12 in the present invention is preferably within 40% to 95% when the sealing unit 6 is lowered to press the wet toner particle cake 1 and seal the gas for aeration. The compressibility referred to herein is calculated by measuring the thickness of the sealing member before compression and the thickness of the sealing member during compression. For example, if the thickness of the sealing member before compression is 50 mm and the thickness of the sealing member during compression is 10 mm, the compressibility of the sealing member is 80%. Here, measurement is made at 12 points of the pressed sealing member and the compressibility is determined as an average of the measured values. Within the range, the gas for aeration can be sealed sufficiently. When the compressibility is less than 40%, deviating from the range mentioned above, the gas for aeration cannot be sealed sufficiently. When it is more than 95%, degradation of the sealing member 12 is significant, which leads to deterioration in sealing properties and dehydrating properties, and thus such a case is not preferable.

The driving unit for lifting and lowering the sealing unit 6 include an air cylinder 17 illustrated in FIG. 2, but it is not limited to this as long as the system can achieve the above-mentioned compressibility of the sealing member 12. A hydraulic cylinder, a driving system using a compressible gas such as an air spring, a driving system using gears, a system for lifting and lowering the sealing unit by combining a pinion which is a circular gear of a small diameter connected to a motor and a rack (a rack having an indented planar bar) connected to the sealing unit and applying the turning force of the motor to the pinion, moving the rack up and down and thereby lifting and lowering the sealing unit, that is, using a so-called rack and pinion, can be used as well.

In the present invention, as illustrated in FIG. 13, the sealing units 6 may be connected to a sealing unit support plate 18, thereby lifting and lowering the two sealing units 6 at the same time by using the above mentioned driving system.

However, this system cannot cope with the case as mentioned above that the depressing pressure needs to differ between the upstream and downstream sides. Preferably, the sealing units 6 on the upstream and downstream sides are connected to respective driving units.

It is preferable that the aeration pressure P1 (kPa) of the gas fed from the aeration unit satisfies 50≦P1≦700. In the case of 50>P1, air permeability deteriorates and it is hard to attain a preferred water content. In the case of P1>700, the cake collapses during dehydration, resulting in short pass of the gas, and therefore, it is hard to obtain a toner cake uniformly and sufficiently dehydrated.

In the present invention, there is a case where a wet toner particle cake 1 adheres to and accumulates on the sealing member 12 depending on the properties of the wet toner particle cake 1 when the wet toner particle cake 1 is repeatedly depressed by the sealing member 12 provided in the sealing unit 6. As a result, sealing properties between the wet toner particle cake 1 and the sealing member 12 to be depressed cannot be kept stable and therefore, the water content of wet toner particle cake 1 cannot be reduced sufficiently. Therefore, it is preferable to provide a filter cloth 23 between the sealing unit 6 and the wet toner particle cake 1 as illustrated in FIGS. 17 and 18. The sealing unit 6 is lifted when the filter cloth 7 below the toner particle cake travels, and the filter cloth 23 is also lifted along with that by the telescopic motion of a cylinder 25. On the other hand, the sealing unit 6 is lowered during the gas aeration, and the filter cloth 23 is also lowered along with that. Thereby, the wet toner particle cake 1 is inhibited from adhering to and accumulating on the sealing member 12 and the sealing between the wet toner particle cake 1 and the sealing member 12 is maintained, enabling the water content to be reduced sufficiently even if operation is performed for a long time.

As a material of the filter cloth 23 provided between the sealing unit 6 and the wet toner particle cake 1, polyethylene terephthalate, polypropylene, polyester and nylon may be used. It is particularly preferable to use polypropylene or polyester as a material which is excellent in water repellency.

The aeration rate through the filter cloth 23 is preferably from 0.5 to 20 cm$^3$/cm$^2$·sec in order to control the resistance of the filter cloth 23 provided between the sealing unit 6 and the wet toner particle cake 1 so that the gas ejected from the gas discharging part 9 is not hindered from sufficiently aerating the wet toner particle cake 1. When the rate is less than 0.5 cm$^3$/cm$^2$·sec, air permeability into the wet toner particle cake 1 is lowered, leading to deterioration in the reduction of the water content. On the other hand, when the rate is more than 20 cm$^3$/cm$^2$·sec, although the air permeability is increased, toner particles pass through the filter cloth and contaminate the sealing member 12, which is not preferable.

It is preferable that the aeration of the gas from the aeration unit 3 and the sealing of the aeration gas by the sealing unit 6 are performed in conjunction with the intermittent drive of the filter cloth 7 mentioned above. It is suitable to perform ejection of the aeration gas and sealing of the aeration gas by lowering the sealing unit 6 when the filter cloth 7 is halted at the intervals of the intermittent motion. It is suitable to stop the aeration of the gas from the aeration unit and to lift the sealing unit 6 when the filter cloth 7 is traveling.

In addition, it is preferable that the filter cloth 7 and the vacuum tray 5 are not in sliding contact, but in close contact, with each other because a vacuum state is preferably formed by evacuation by means of a vacuum pump which is connected to a vacuum tray 5 during the gas aeration. The wet toner particle cake 1 on the filter cloth 7 is maintained in a good cake state during the gas aeration when the high degree of vacuum is formed in the vacuum tray 5.

As illustrated in FIG. 1, the toner particle cake 21 which has passed through the dehydrating apparatus and has been dehydrated is exfoliated from the filter cloth 7 by curvature coming from the roll 33.

It is preferable that the water content of the obtained dehydrated toner particle cake is equal to or less than 30%. When the water content exceeds 30%, troubles in the transportation to the drying step, which is a post-process, may occur and efficiency in the drying step itself may be decreased, which is not preferable. In addition, in the drying step, it is preferable that flash drying is carried out by dispersing the dehydrated toner particle cake 21 in the form of powdery particles in a hot air stream and performing drying while sending the particles into a concurrent flow with the hot air stream. The flash drying can dry a large quantity of toner particles at low cost in a short time. It is preferable to use a flash dryer having a cycle pipe as a flash dryer in order to perform homogeneous drying.

Specifically, a flash jet dryer (manufactured by SEISHIN ENTERPRISE CO., LTD.) is preferably used. However, when the flash dryer mentioned above is used, a detention period in the cycle pipe increases as the water content of the material to be dried increases, and the toner particles tend to deteriorate and problems in the image quality are liable to occur. Therefore, it becomes important to reduce the water content of the dehydrated toner particle cake 21 before drying by using the dehydrating apparatus of the present invention.

The production method of the toner particle in the present invention can be preferably used for the production method of magnetic toner particles. For example, magnetic substances usable in the production of magnetic toner particles in the case of wet granulation method by suspension polymerization method are described below.

It is preferable that the surface of the magnetic substances used for a magnetic toner is made hydrophobic. When making a magnetic substance hydrophobic, it is very preferable that a method of carrying out surface treatment by dispersing the magnetic substance in an aqueous medium is used so that the magnetic substance particles may be in a primary particle size while a coupling agent is hydrolyzed. According to this hydrophobic treatment method, magnetic substance particles are not easily united with each other as compared with the treatment in a gaseous phase and the magnetic substance is surface treated in the state of approximately primary particles because electrostatic charge repulsion acts between the magnetic substance particles subjected to the hydrophobic treatment.

The method of treating the surface of the magnetic substance while hydrolyzing a coupling agent in an aqueous medium does not need to use a coupling agent which produces gas such as chlorosilane and silazane. In addition, the effect of the hydrophobic treatment is great since it enables to use a coupling agent having high viscosity which has been difficult to use to achieve satisfactory treatment because the magnetic substance particles are easy to unite with each other in a gaseous phase. Examples of the coupling agent usable in the surface treatment of the magnetic substance in the present invention include silane coupling agents and titanium coupling agents. Silane coupling agents and those represented by the following general formula are more preferably used:

$$R_m SiY_n$$

wherein, R represents an alkoxy group, m represents an integer from 1 to 3, Y represents a functional group selected from the group consisting of an alkyl group, a vinyl group, a glycidoxy group and a methacryl group, and n represents an integer from 1 to 3.

Examples thereof may include the following: vinyltrimethoxysilane, vinyltriethoxysilane, vinyltris(β-methoxyethoxy)silane, β-(3,4 epoxycyclohexyl)ethyltrimethoxysilane, γ-glycidoxypropyltrimethoxysilane, γ-glycidoxypropylmethyldiethoxysilane, γ-aminopropyltriethoxysilane, N-phenyl-γ-aminopropyltrimethoxysilane, γ-methacryloxypropyltrimethoxysilane, vinyltriacetoxysilane, methyltrimethoxysilane, dimethyldimethoxysilane, phenyltrimethoxysilane, diphenyldimethoxysilane, methyltriethoxysilane, dimethyldiethoxysilane, phenyltriethoxysilane, diphenyldiethoxysilane, n-butyltrimethoxysilane, isobutyltrimethoxysilane, trimethylmethoxysilane, hydroxypropyltrimethoxysilane, n-hexadecyltrimethoxysilane and n-octadecyl trimethoxysilane.

Among these, it is preferable to use a silane coupling agent having a double bond so as to further improve the dispersibility of the magnetic substance. Phenyltrimethoxysilane, γ-methacryloxypropyltrimethoxysilane and γ-glycidoxypropyltrimethoxysilane are more preferable. This is considered to result from an enhanced affinity between the magnetic substance and the polymerizable monomer when treated with a coupling agent having a double bond particularly in the case of suspension polymerization. The dispersibility of the magnetic substance in the toner particles is improved.

However, when only such a coupling agent having a double bond is used, it is difficult to provide the magnetic substance with sufficient hydrophobicity, and the particle size distribution of the toner becomes wide because the magnetic substance whose hydrophobicity is not sufficient is exposed on the toner surface. The reason for this has not been elucidated, but it is considered that it is based on the fact that hydrophobicity of the coupling agent itself, reactivity with the active group on the magnetic substance surface and coating properties of the magnetic substance surface are inferior. On this account, it is more preferable to use in combination an alkyltrialkoxysilane coupling agent represented by the following formula to attain sufficient hydrophobicity.

$$C_pH_{2p+1}\text{—Si—}(OC_qH_{2q+1})_3$$

(wherein, p represents an integer from 2 to 20 and q represents an integer from 1 to 3].

When p is less than 2 in the above formula, hydrophobic treatment becomes easy, but it is difficult to impart hydrophobicity sufficiently, and the exposure of the magnetic particles from toner particles becomes difficult to suppress. In the meantime, when p is more than 20, hydrophobicity becomes sufficient, but magnetic substance particles are more liable to be united with each other, and it becomes difficult to sufficiently disperse the magnetic substance particles, and the particle size distribution tends to be broader. In addition, when q is more than 3, the reactivity of the silane coupling agent decreases, and it becomes hard to sufficiently perform hydrophobic treatment. It is more preferable to use an alkyltrialkoxysilane coupling agent where, in the above-mentioned formula, p is an integer from 3 to 15 and q is 1 or 2.

The total amount of the silane coupling agent used for the treatment is from 0.05 to 20 parts by mass, preferably from 0.1 to 10 parts by mass, with respect to 100 parts by mass of the magnetic substance and it is preferable to adjust the amount of the treatment agent according to the surface area of the magnetic substance and the reactivity of the coupling agent.

The aqueous medium used in the hydrophobic treatment mentioned above is a medium which contains water as a major component. Specifically, the aqueous medium includes water itself, water with a small amount of a surfactant added thereto, water with a pH regulator added thereto and water with an organic solvent added thereto. As the surfactant, a nonionic surfactant such as polyvinyl alcohol is preferable. It is suitable to add a surfactant in an amount from 0.1 to 5 mass % for water. The pH regulator includes inorganic acids such as hydrochloric acid, and the organic solvent includes alcohols.

When two or more kinds of coupling agents are used, the coupling agents are added at a time or with some time lags therebetween to treat the magnetic substance.

Aggregation of particles is not observed in the magnetic substance thus obtained and the individual particle surface has been uniformly subjected to hydrophobic treatment, and therefore, dispersibility of the magnetic substance in the polymerizable monomer becomes good.

The magnetic substance may contain an element such as phosphorus, cobalt, nickel, copper, magnesium, manganese, aluminum and silicon. The magnetic substance is based on an iron oxide such as triiron tetroxide and γ-iron oxide, and these may be used each singly or in combination. The BET specific surface area of these magnetic substances according to the nitrogen adsorption method is preferable 2 to 30 m²/g, preferably 3 to 28 m²/g, and those having Mohs hardness from 5 to 7 are preferable.

In the case of wet granulation method, it is preferable that the magnetic substance is used in an amount from 10 to 200 parts by mass based on 100 parts by mass of a polymerizable monomer or a binder resin. It is more preferable to use 20 to 180 parts by mass. With less than 10 parts by mass, coloring power of the toner is poor and fogging is also difficult to suppress. In the meantime, when the amount surpasses 200 parts by mass, stronger retentivity of the obtained toner to the toner carrier by magnetic force causes developing properties to deteriorate and it becomes difficult for the magnetic substance to uniformly disperse into individual toner particles, and besides fixing properties deteriorate.

Measurement of the content of the magnetic substance in the toner is performed with a thermal analysis equipment, TGA7 manufactured by PerkinElmer Inc. The measurement method includes heating a toner from normal temperature to 900° C. at a temperature elevation rate of 25° C./min in a nitrogen atmosphere, and the weight loss mass % in the region from 100° C. to 750° C. is assumed as the mass of the binder resin and the remaining mass is approximately assumed as the mass of the magnetic substance.

The magnetic substance is produced by the following method, for example, in the case of magnetite.

An alkali such as sodium hydroxide is added to a ferrous salt aqueous solution in an equivalent or more amount with respect to the iron ingredient to prepare an aqueous solution containing ferrous hydroxide. The pH of the prepared aqueous solution is maintained at 7 or more (preferably, pH 8 to 14) and the aqueous solution is warmed to equal or higher than 70° C. while air is blown into the solution to perform oxidation reaction of ferrous hydroxide, thereby generating seed crystals which serve as cores of magnetic iron oxide particles.

Then, an aqueous solution containing about one equivalent ferrous sulfate based on the amount of the alkali previously added is added to a slurry liquid containing the seed crystals. The pH of the liquid is maintained at 6 to 14 and the reaction of ferrous hydroxide is allowed to proceed while air is blown into the liquid to cause magnetic iron oxide particles to grow on the seed crystals as cores. As the oxidation reaction proceeds, the pH of the liquid shifts to the acidic side, but the pH of the liquid is preferably kept at 6 or more. The pH of the liquid is adjusted at the end of the oxidation reaction, and the liquid is sufficiently stirred so that the magnetic iron oxide may become primary particles. A coupling agent is added thereto, mixed and stirred sufficiently, and filtered after being stirred, dried and lightly disintegrated to thereby obtain iron oxide particles subjected to hydrophobic treatment. Alternatively, iron oxide particles obtained by washing and filtration after the oxidation reaction is completed may be dispersed again in another aqueous medium without drying, and after that, a silane coupling agent may be added while adjusting the pH of the re-dispersed liquid and sufficiently stirring the liquid, thereby performing coupling treatment. In any case, it is preferable to perform surface treatment without passing through a drying step after the oxidation reaction is completed.

As a ferrous salt, it is possible to use iron sulfate which is a by-product accompanying the sulfuric acid method titanium production and iron sulfate which is a by-product accompanying the surface washing of steel sheet and besides iron chloride.

When iron sulfate is used in a production method of the magnetic iron oxide according to the aqueous solution method, an aqueous solution having an iron content of 0.5 to 2 mol/l is generally used for preventing an increase in the viscosity at the time of the reaction and because of the solubility of iron sulfate. Generally, as the concentration of iron sulfate decreases, the particle size of the product tends to become smaller. As for the reaction, particles are apt to become finer, as the amount of air is larger, and as the reaction temperature is lower.

Stable toner charge properties are obtained, and higher transfer efficiency, higher image quality and higher stability can be achieved by using a magnetic toner which uses as a material hydrophobic magnetic substance particles produced as above.

The magnetic substance obtained as above can be suitably used as a coloring agent to be contained in toner particles. Nonmagnetic coloring agents which can be suitably used as well as the magnetic substance mentioned above, include carbon black and yellow/magenta/cyan coloring agents shown below are included.

As a coloring agent which is suitable for a yellow toner, pigment or dye can be used. Specifically, the following may be cited as a yellow pigment: C. I. Pigment Yellow 1, 2, 3, 4, 5, 6, 7, 10, 11, 12, 13, 14, 15, 17, 23, 62, 65, 73, 74, 81, 83, 93, 94, 95, 97, 98, 109, 110, 111, 117, 120, 127, 128, 129, 137, 138, 139, 147, 151, 154, 155, 167, 168, 173, 174, 176, 180, 181, 183, 191 and C. I. Vat Yellow 1, 3, 20. The following may be included in a yellow dye: C. I. Solvent Yellow 19, 44, 77, 79, 81, 82, 93, 98, 103, 104, 112, 162. These can be used each singly or in combination.

As a coloring agent which is suitable for a magenta toner, pigment or dye can be used. Specifically, the following may be cited as a magenta pigment: C. I. Pigment Red 1, 2, 3, 4, 5, 6, 7, 8, 9, 10, 11, 12, 13, 14, 15, 16, 17, 18, 19, 21, 22, 23, 30, 31, 32, 37, 38, 39, 40, 41, 48, 48:2, 48:3, 48:4, 49, 50, 51, 52, 53, 54, 55, 57, 57:1, 58, 60, 63, 64, 68, 81, 81:1, 83, 87, 88, 89, 90, 112, 114, 122, 123, 144, 146, 150, 163, 166, 169, 177, 184, 185, 202, 206, 207, 209, 220, 221, 238, 254; C. I. Pigment Violet 19; C. I. Vat Red 1, 2, 10, 13, 15, 23, 29, 35. The following may be cited as a magenta dye: Oil soluble dyes such as C. I. Solvent Red 1, 3, 8, 23, 24, 25, 27, 30, 49, 52, 58, 63, 81, 82, 83, 84, 100, 109, 111, 121, 122; C. I. Disperse Red 9, C. I. Solvent Violet 8, 13, 14, 21, 27; C. I. Disperse Violet 1; Basic dyes such as C. I. Basic Red 1, 2, 9, 12, 13, 14, 15, 17, 18, 22, 23, 24, 27, 29, 32, 34, 35, 36, 37, 38, 39, 40; C. I. Basic Violet 1, 3, 7, 10, 14, 15, 21, 25, 26, 27, 28. These can be used each singly or in combination.

As a coloring agent which is suitable for a cyan toner, pigment or dye can be used. Specifically, the following may be cited as a cyan pigment: C. I. Pigment Blue 1, 7, 15, 15:1, 15:2, 15:3, 15:4, 16, 17, 60, 62, 66; C. I. Vat Blue 6, C. I. Acid Blue 45. The following may be cited as a cyan dye: C. I. Solvent Blue 25, 36, 60, 70, 93, 95. These can be used each singly or in combination.

The coloring agents may be used each singly or in a mixture of two or more of them or in a state of a solid solution. The coloring agent of the present invention is selected from the viewpoints of hue angle, saturation, lightness, weatherability, OHP transparency and dispersibility in the toner. For example, in the case of wet granulation method by suspension polymerization method, the coloring agent is used in an amount of 1 to 20 parts by mass based on 100 parts by mass of a polymerizable monomer or a binder resin.

The toner particles produced in the present invention may contain a releasing agent. As the releasing agent, the following may be included: Petroleum-based wax such as paraffin wax, microcrystallin wax and petrolatum and the derivatives thereof; montan wax and the derivatives thereof; hydrocarbon wax by the Fischer-Tropsch process and the derivatives thereof; polyolefin wax such as polyethylene wax and polypropylene wax and the derivatives thereof; natural wax such as carnauba wax and candelilla wax and the derivatives thereof. The derivatives include oxidation products, block-copolymers with a vinyl monomer and graft modified products. Further, higher aliphatic alcohols, fatty acids such as stearic acid and palmitic acid or the compounds thereof, acid amide wax, ester wax, ketone, hydrogenated castor oil and the derivatives thereof, vegetable wax, animal wax may be included.

Specific examples of the wax usable as a releasing agent include VISCOL (registered trademark) 330-P, 550-P, 660-P, TS-200 (Sanyo Chemical Industries, Ltd.), Hi-wax 400P, 200P, 100P, 410P, 420P, 320P, 220P, 210P, 110P (Mitsui Chemicals, Inc.), Southall H1, H2, C80, C105, C77 (Schumann Southall Corporation), HNP-1, HNP-3, HNP-9, HNP-10, HNP-11, HNP-12 (Nippon Seiro Co., Ltd.), Unilin (registered trademark) 350, 425, 550, 700, unicid (registered trademark), unicid (registered trademark) 350, 425, 550, 700 (Toyo Petrolite Co., Ltd.); Japan wax, bees wax, rice wax, candelilla wax, carnauba wax (available from CERARICA NODA Co., Ltd.).

A charge control agent may be incorporated in the toner particles. As the charge control agent, any known charge control agents can be used. Furthermore, for example, in the case of a wet granulation method according to a suspension polymerization method, when toner particles are produced, charge control agents low in polymerization inhibitory action and substantially free of matters soluble in the aqueous dispersion medium are particularly preferable. As negative charge control agents, the following may be cited: Metal compounds of aromatic carboxylic acids such as salicylic acid, alkylsalicylic acids, dialkylsalicylic acids, naphthoic acid and dicarboxylic acid; metal salts or metal complexes of azo dyes or azo pigments; polymer type compounds having a sulfonic acid or carboxylic acid group in the side chain; boron compounds, urea compounds, silicon compounds and carixarene. As positive charge control agents, the following may be cited: Quaternary ammonium salts, polymer type compounds having such a quaternary ammonium salt in the side chain, guanidine compounds, nigrosine compounds and imidazole compounds.

A method for incorporating the charge control agent into the toner includes a method of internally adding the charge control agent to the toner particles and a method of externally adding the charge control agent to the toner particles. The amount of the charge control agent used depends on types of binder resins, the presence of other additives, and toner production methods inclusive of dispersing methods, and can not be uniquely specified. Preferably, when internally added, the charge control agent may be used in an amount ranging from 0.1 to 10 parts by mass, and more preferably from 0.1 to 5 parts by mass, based on 100 parts by mass of a polymerizable monomer or a binder resin. When externally added, it may preferably be added in an amount of 0.005 to 1.0 part by mass, more preferably 0.01 to 0.3 part by mass based on 100 parts by mass of the toner particles.

In the present invention, the following may be cited as the polymerizable monomer in the case of a wet granulation method according to an emulsion polymerization method and a suspension polymerization method.

Styrene; styrene monomers such as o-methylstyrene, m-methylstyrene, p-methylstyrene, p-methoxystyrene and p-ethylstyrene; acrylic esters such as methyl acrylate, ethyl acrylate, n-butyl acrylate, isobutyl acrylate, n-propyl acrylate, n-octyl acrylate, dodecyl acrylate, 2-ethylhexyl acrylate, stearyl acrylate, 2-chloroethyl acrylate and phenyl acrylate; methacrylic esters such as methyl methacrylate, ethyl methacrylate, n-propyl methacrylate, n-butyl methacrylate, isobutyl methacrylate, n-octyl methacrylate, dodecyl methacrylate, 2-ethylhexyl methacrylate, stearyl methacrylate, phenyl methacrylate, dimethylaminoethyl methacrylate and diethylaminoethyl methacrylate; acrylonitrile, methacrylonitrile and acrylamides.

In the production method of a toner according to the present invention, polymerization may be carried out by adding a resin to the polymerizable monomer in the case of a wet granulation method according to a suspension polymerization method. A polymerizable monomer unit containing a hydrophilic functional group such as an amino group, a carboxylic group, a hydroxyl group, a sulfonic acid group, a glycidyl group or a nitrile group cannot be used because the polymerizable monomer is water-soluble, and dissolves in an aqueous suspension to cause emulsion polymerization. When such a monomer unit is intended to be introduced into the toner particles, the unit is preferably added in the form of a copolymer such as a random copolymer, a block copolymer or a graft copolymer, with a vinyl compound such as styrene or ethylene, in the form of a polycondensation product such as polyester or polyamide, or in the form of a polyaddition product such as polyether or polyimine.

An alcohol component and an acid component which constitute a polyester resin to be added to the above-mentioned polymerizable monomer are exemplified below. As the alcohol component, the following may be cited: Ethylene glycol, propylene glycol, 1,3-butanediol, 1,4-butanediol, 2,3-butanediol, diethylene glycol, triethylene glycol, 1,5-pentanediol, 1,6-hexanediol, neopentyl glycol, 2-ethyl-1,3-hexanediol, cyclohexane dimethanol, butenediol, octenediol, cyclohexene dimethanol, hydrogenated bisphenol A, a bisphenol derivative represented by Formula (I) or a hydrogenated compound of the compound represented by Formula (I):

[Formula 1]

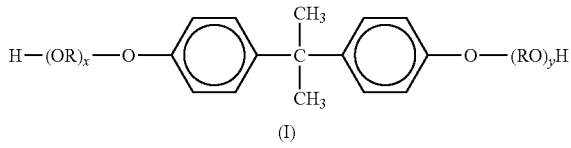

(I)

wherein, R represents an ethylene group or a propylene group, each of x and y is an integer equal to or more than 1 and the average value of x+y is 2 to 10.

Or a diol represented by Formula (II) or a hydrogenated compound of the compound represented by Formula (II):

[Formula 2]

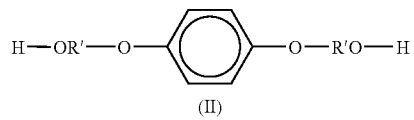

(II)

wherein, R' is

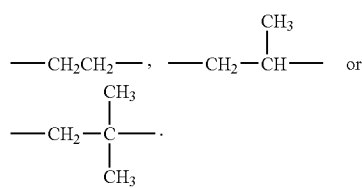

As a dibasic carboxylic acid, the following may be cited: Benzenedicarboxylic acids or anhydrides thereof such as phthalic acid, terephthalic acid, isophthalic acid and phthalic anhydride; alkyldicarboxylic acids such as succinic acid, adipic acid, sebacic acid and azelaic acid, or anhydrides thereof, or succinic acid substituted with a alkyl or alkenyl group having 6 to 18 carbon atoms or anhydrides thereof; and unsaturated dicarboxylic acids such as fumaric acid, maleic acid, citraconic acid and itaconic acid, or anhydrides thereof.

Further, as the alcohol component, the following may be cited: Polyhydric alcohols such as glycerol, pentaerythritol, sorbitol, sorbitan, and oxyakylene ethers of novolak phenol resins. As the acid component, the following may be cited: Polyvalent carboxylic acids such as trimellitic acid, pyromellitic acid, 1,2,3,4-butanetetracarboxylic acid, benzophenonetetracarboxylic acid and anhydrides thereof.

The polyester resin in the present invention is preferably composed of 45 to 55 mol % of the alcohol component and 55 to 45 mol % of the acid component. In the present invention, as long as physical properties of the toner particles obtained are not adversely affected, it is also preferable to use two or more kinds of polyester resins in combination or to regulate physical properties by modifying the polyester resin with a silicone or a fluoroalkyl-group-containing compound. In the case where a high polymer containing such a polar functional group is used, one having a number average molecular weight of 5,000 or more may preferably be used.

Resins other than the above may also be added to the monomer composition. The resins usable therefor may include the following: Polystyrene; homopolymers of a substituted styrene monomer such as polyvinyl toluene; styrene copolymers such as a styrene-propylene copolymer, a styrene-vinyltoluene copolymer, a styrene-vinylnaphthalene copolymer, a styrene-methyl acrylate copolymer, a styrene-ethyl acrylate copolymer, a styrene-butyl acrylate copolymer, a styrene-octyl acrylate copolymer, a styrene-dimethylaminoethyl acrylate copolymer, a styrene-methyl methacrylate copolymer, a styrene-ethyl methacrylate copolymer, a styrene-butyl methacrylate copolymer, a styrene-dimethylaminoethyl methacrylate copolymer, a styrene-methyl vinyl ether copolymer, a styrene-ethyl vinyl ether copolymer, a styrene-methyl vinyl ketone copolymer, a styrene-butadiene copolymer, a styrene-isoprene copolymer, a styrene-maleic acid copolymer and a styrene-maleate copolymer; and polymethyl methacrylate, polybutyl methacrylate, polyvinyl acetate, polyethylene, polypropylene, polyvinyl butyral, silicone resins, polyester resins, polyamide resins, epoxy resins, polyacrylic acid resins, rosins, modified rosins, terpene resins, phenolic resins, aliphatic or alicyclic hydrocarbon resins, and aromatic petroleum resins. These can be used each singly or in the form of a mixture.

These resins may preferably be added in an amount of 1 to 20 parts by mass based on 100 parts by mass of the polymerizable monomer. When added in an amount of less than 1 part by mass, the effect of addition is small, and on the other hand, when added in an amount of more than 20 parts by mass, it difficult to design various physical properties of the polymerization toner. Furthermore, a polymer having a molecular weight different from the molecular weight range of the toner, which is obtained by polymerizing a polymerizable monomer may be dissolved in the polymerizable monomer.

When a polymerization initiator is used in the production method of a toner of the present invention for the purpose of initiating the polymerization reaction of a polymerizable monomer, it is preferable that a polymerization initiator having a half-life of 0.5 to 30 hours at a polymerization reaction temperature is added in an amount of 0.5 to 20 parts by mass based on 100 parts by mass of the polymerizable monomer. This enables to obtain a polymer having a maximum value in the region of molecular weight of 10,000 to 100,000, and enables the toner to be endowed with a desired strength and appropriate melt characteristics. As the polymerization initiator, the following may be included. Azo type or diazo type polymerization initiators such as 2,2'-azobis-(2,4-dimethylvaleronitrile), 2,2'-azobisisobutyronitrile, 1,1'-azobis(cyclohexane-1-carbonitrile), 2,2'-azobis-4-methoxy-2,4-dimethylvaleronitrile and azobisisobutyronitrile; and peroxide type polymerization initiators such as benzoyl peroxide, methyl ethyl ketone peroxide, diisopropyl peroxycarbonate, cumene hydroperoxide, 2,4-dichlorobenzoyl peroxide, lauroyl peroxide, t-butyl peroxy-2-ethylhexanoate and t-butyl peroxypivarate.

When a toner of the present invention is produced, a cross-linking agent may be added and preferable addition amount is from 0.001 to 15 parts by mass based on 100 parts by mass of the polymerizable monomer. As the cross-linking agent, a compound having two or more polymerizable double bonds is primarily used. The following may be cited: Aromatic divinyl compounds such as divinyl benzene and divinyl naphthalene; carboxylic acid esters having two double bonds such as ethylene glycol diacrylate, ethylene glycol dimethacrylate and 1,3-butanediol dimethacrylate; divinyl compounds such as divinyl aniline, divinyl ether, divinyl sulfide and divinyl sulfone; and compounds having three or more vinyl groups. These can be used each singly or in the form of a mixture of two or more of them.

A method of producing a toner in the present invention includes a method of fusing minute resin particles in an aqueous medium to prepare a toner. This method is not particularly limited and includes, for example, methods disclosed in Japanese Patent Application Laid-Open Nos. H05-265252, H06-329947 and H09-015904. That is, a toner in the present invention can be formed by a method including associating minute resin particles and dispersed particles constituting materials such as a coloring agent, or associating a plurality of fine particles including a resin and a coloring agent, particularly, by dispersing these in an aqueous medium with an emulsifier and then performing salting-out by adding a flocculant in a concentration higher than the critical flocculation concentration, and at the same time, performing heating and fusing at a temperature higher than the glass transition temperature of the formed polymer and heating and drying the moisture containing particles in a fluidized state. Here, an organic solvent which can be dissolved infinitely in water may be added along with a flocculent.

The so-called seed polymerization method including causing a monomer to be further adsorbed on the polymer particles obtained and then performing polymerization using a polymerization initiator can also be suitably used in the present invention.

A specific toner production method is described below where, for example, a wet granulation method according to a suspension polymerization method is selected.

At first, components essential to a toner such as a pigment, a releasing agent, a plasticizer, a charge control agent and a cross-linking agent and optionally other additives (for example, an organic solvent added to reduce the viscosity of a polymer produced in the polymerization reaction, a high polymer and a dispersant) are appropriately added and uniformly dissolved or dispersed in a polymerizable monomer composition to obtain a coloring agent containing polymerizable monomer composition. At this step, temperature control may be performed as needed. This polymerizable monomer composition is suspended in an aqueous medium containing a dispersion stabilizing agent and granulated.

Simultaneously with or after the granulation of the polymerizable monomer composition, a polymerization initiator is added to polymerize the above composition (polymerization step). As for the specific timing for adding a polymerization initiator, it may be added at the same time that other additives are added to the polymerizable monomer or immediately before being suspended in an aqueous medium. In addition, an additional polymerizable monomer or a polymerization initiator dissolved in a solvent can be added immediately after granulation and before starting the polymerization reaction or during the polymerization reaction.

After the granulation, while controlling temperature, stirring is performed with an ordinary stirrer to maintain the particle state and to prevent floating and sedimentation of the particles.

In the case where the toner particles are produced, known surfactants or organic dispersants or inorganic dispersants as a dispersion stabilizing agent may be used. In particular, inorganic dispersants may hardly cause any harmful ultrafine powder and attain dispersion stability on account of their steric hindrance and therefore, even when reaction temperature is changed, they may hardly disrupt the stability, and hence they may preferably be used. As the inorganic dispersants, the following may be cited: Phosphoric acid polyvalent metal salts such as calcium phosphate, magnesium phosphate, aluminum phosphate and zinc phosphate; carbonates such as calcium carbonate and magnesium carbonate; inorganic salts such as calcium metasilicate, calcium sulfate and barium sulfate; and inorganic hydroxides such as calcium hydroxide, magnesium hydroxide and aluminum hydroxide; and inorganic oxides such as silica, bentonite, and alumina.

These inorganic dispersants are preferably used in an amount of from 0.2 to 20 parts by mass based on 100 parts by mass of the polymerizable monomer. A surfactant may further be used along with the dispersant in an amount of 0.001 to 0.1 part by mass.

As the surfactant, the following may be cited: Sodium dodecylbenzenesulfate, sodium tetradecyl sulfate, sodium pentadecyl sulfate, sodium octyl sulfate, sodium oleate, sodium laurate, sodium stearate and potassium stearate.

When these inorganic dispersants are used, they may be used as they are, but in order to obtain finer particles, particles of the inorganic dispersant may be formed in-situ in the aqueous medium. For example, in the case of calcium phosphate, a sodium phosphate aqueous solution and a calcium chloride aqueous solution may be mixed under high-speed agitation, whereby water-insoluble calcium phosphate can be formed and more uniform and finer dispersion can be attained. Here, water-soluble sodium chloride is simultaneously formed as a by-product. However, the presence of a water-soluble salt in the aqueous medium keeps the polymerizable monomer from being dissolved in water, so that ultrafine toner particles is hardly formed in emulsion polymerization, and therefore this is more favorable. After the polymerization is completed, the inorganic dispersants are dissolved with an acid or an alkali and can be almost completely removed through subsequent processes such as filtration and washing.

In the step of polymerization, the polymerization may be carried out at polymerization temperature set at 40° C. or higher and typically at a temperature of 50° C. to 90° C. Where the polymerization is carried out in this temperature range, a releasing agent and/or wax to be enclosed within the particles is deposited by phase separation so as to be more perfectly enclosed within the particles. In order to exhaust residual polymerizable monomers, the reaction temperature may be raised to 90° C. to 150° C. at the terminal stage of polymerization reaction. After the polymerization reaction is completed, the obtained dispersion liquid of toner particles are filtered with a belt filter equipped with a dehydrating apparatus according to the present invention, washed and dried preferably with a flash dryer.

Typically, coarse powders and fine powders, which are outside the desired particle size range, are removed from the obtained toner particles in the step of classification, and toner particles are obtained. The classification step can be performed according to any known method conventionally used in the production of toner and is not particularly limited thereto. A toner can be obtained by mixing the toner particles obtained through the classification step with an external additive such as inorganic fine powders and by adhering the external additive to the surface of the toner particles. In the present invention, either of an embodiment in which a toner is directly obtained from the production step omitting the classification step or an embodiment in which coarse powders and fine powders are removed with a high degree of accuracy by performing a more highly precise classification step is one of the preferable embodiments.

In the present invention, an embodiment in which fine inorganic particles having a number average primary particle size of 4 to 80 nm are added to the toner as a fluidizing agent among the above-mentioned external additives is also one of the preferable embodiments.

The inorganic fine powder used in the present invention includes silica, alumina and titanium oxide powder. For example, as the fine silica powder, the so called dry-process silica or fumed silica produced by vapor phase oxidation of silicon halides and the so called wet-process silica produced from water glass can be used. The dry-process silica is more preferred, as having less silanol groups on the particle surfaces and interiors of the fine silica powder and leaving less production residues such as $Na_2O$ and $SO^{3-}$. In the dry-process silica, it is also possible to use, for example, in its production step, the other metal halide compound such as aluminum chloride or titanium chloride together with a silicon halide compound to obtain a composite fine powder of silica with the other metal oxide. The fine silica powder includes such powder as well.

The inorganic fine powder having an average primary particle size of 4 to 80 nm is preferably added in an amount of 0.1 to 3.0% by mass with respect to the mass of the toner particles. When added in an amount of less than 0.1% by mass, the effect of the addition is insufficiently exhibited. When added in an amount of more than 3.0% by mass, the fixing properties of the toner may deteriorate. The content of the inorganic fine powder can be determined by fluorescent X-ray analysis and using a calibration curve prepared from standard samples.

Since the inorganic fine powder is preferably a powder having been subjected to hydrophobic treatment in consideration of characteristics under a high temperature and high humidity environment. As a treating agent used for the hydrophobic treatment, usable are a silicone varnish, a modified silicone varnish of various types, a silicone oil, a modified silicone oil of various types, a silane compound, a silane coupling agent, other organic silicon compound and an organotitanium compound, which may be used each singly or in combination.

As a method for treating the inorganic fine powder, a method may be cited in which silylation reaction is conducted as a first-stage reaction to cause silanol groups to disappear by chemical bonding, and thereafter, as a second-stage reaction, hydrophobic thin films are formed on the particle surfaces from a silicone oil.

The viscosity of the silicone oil at 25° C. is preferably 10 to 200,000 $mm^2/s$, and more preferably from 3,000 to 80,000 $mm^2/s$. If the viscosity is less than 10 $mm^2/s$, the inorganic fine powder may have no stability, and the image quality tends to deteriorate due to thermal and mechanical stresses. If the viscosity is more than 200,000 $mm^2/s$, uniform treatment tends to be hard to carry out.

As the silicone oil, the following is particularly preferably used: dimethylsilicone oil, methylphenylsilicone oil, α-methylstyrene modified silicone oil, chlorophenylsilicone oil and fluorine modified silicone oil.

In a method for treating the inorganic fine powder with a silicone oil, the inorganic fine powder having been treated with a silane compound and the silicone oil may directly be mixed by means of a mixer such as a Henschel mixer, or a silicone oil may be sprayed on the inorganic fine powder. Alternatively, a method may be used in which a silicone oil is dissolved or dispersed in a suitable solvent and thereafter the inorganic fine powder is added and mixed, followed by removing the solvent. In view of such an advantage that agglomerates of the inorganic fine powder can be reduced, the method in which a silicone oil is sprayed is preferred. The silicone oil may be used for the treatment in an amount of 1 to 40 parts by mass, and preferably from 3 to 35 parts by mass, based on 100 parts by mass of the inorganic fine powder.

In order to endow the toner with good fluidity, the silica used in the present invention may preferably be one having a specific surface area ranging from 20 to 350 $m^2/g$, and more preferably from 25 to 300 $m^2/g$, in measurement by the BET method utilizing nitrogen adsorption.

The specific surface area is measured according to the BET method, where nitrogen gas is adsorbed onto sample surfaces using a specific surface area measuring apparatus AUTOSOBE 1 (manufactured by Yuasa Ionics Co. Ltd.), and the specific surface area is calculated by the BET multiple point method.

In order to improve cleaning performance in the toner in the present invention, an embodiment in which inorganic or organic closely spherical fine particles having a primary particle size of more than 30 nm (more preferably a primary particle size equal to or more than 50 nm) are further externally added as an external additive to the toner particles is also one of the preferred embodiments. Inorganic or organic fine particles having a specific surface area less than 50 $m^2/g$ (preferably a specific surface area less than 30 $m^2/g$) can be preferably used. The fine particles include spherical silica particles, spherical polymethylsilsesquioxane particles and spherical resin particles.

Other external additives may further be added to the toner particles as long as the addition substantially does not adversely affect the toner. Examples thereof may include lubricant powders such as polyethylene fluoride powder, zinc stearate powder and polyvinylidene fluoride powder; abrasives such as cerium oxide powder, silicon carbide powder and strontium titanate powder; fluidity-providing agents such as titanium oxide powder and aluminum oxide powder; and anti-caking agents. Reverse-polarity organic particles and inorganic particles may also be used in a small quantity as a developability improver. These external additives may also be used after hydrophobic treatment of their particle surfaces.

The toner produced in the present invention can be used as a one-component developer. In the case of a polymer toner used as a one-component developer and containing a magnetic material, there is a method in which the polymer toner is transported and charged by a built-in magnet in a development sleeve. However, it is not necessarily limited to such a one-component developer as above and may be used as a two-component developer.

In the case of using the toner as a two-component developer, a magnetic carrier is used along with the toner. As the magnetic carrier, one or two or more elements selected from the group consisting of iron, copper, zinc, nickel, cobalt, manganese and chromium, are used each singly or in the state of a composite ferrite. The magnetic carrier may have any of a globular shape, a flat shape, and an amorphous shape. Further, it is preferable to control even the microstructure of the surface of the magnetic carrier particles (for example, surface irregularities). Generally, the above inorganic oxide is sintered and granulated to produce magnetic carrier core particles in advance, and then the carrier core particles are coated with a resin. In order to reduce the load of the magnetic carrier on the toner, it is possible to knead an inorganic oxide and a resin, and then carry out pulverization and classification to obtain a low-density dispersion carrier, or alternatively, it is possible to carry out suspension polymerization of a kneaded product of an inorganic oxide and a monomer directly in the aqueous medium to obtain a perfectly globular magnetic carrier.

Of these, a coated carrier in which the surfaces of the carrier core particles are coated with a resin is particularly preferable. The method for coating the surfaces of the carrier core particles with a resin includes a method including dissolving or suspending the resin in a solvent and applying and attaching the solution or suspension to the carrier cores, or a method including mixing the resin powder with the carrier core particles simply and attaching the mixture.

Examples of the material to be fixed on the surfaces of the carrier particles, which vary according to the toner material, include the following: Polytetrafluoroethylene, a monochlorotrifluoroethylene polymer, polyvinylidene fluoride, a silicone resin, a polyester resin, a styrene resin, an acrylic resin, polyamide, polyvinyl butyral, and an aminoacrylate resin. These may be used each singly or in combination.

The carrier preferably has the following magnetic properties. The intensity of magnetization at 79.6 kA/m ($\sigma_{1000}$) after the carrier is magnetically saturated is preferably 3.77 to 37.7 $\mu$Wb/cm$^3$. In order to achieve higher image quality, the intensity of magnetization is more preferably 12.6 to 31.4 $\mu$Wb/cm$^3$. If higher than 37.7 $\mu$Wb/cm$^3$, it is difficult to obtain a toner image with high image quality. In contrast, if lower than 3.77 $\mu$Wb/cm$^3$, the magnetic constraining force is reduced, and thus adhesion of the carrier easily occurs.

As for the mixing ratio in the case where a two-component developer is prepared by mixing a magnetic carrier with a toner used in the present invention, a toner concentration of 2 to 15 mass %, preferably 4 to 13 mass %, in the developer brings about good results.

Each of the methods for measurement and evaluation used in the present invention is described below.

(1) Method for Measuring Weight Average Particle Size (D4) and Number Average Particle Size (D1)

The weight-average particle size (D4) and the number average particle size (D1) of the toner were measured with "Coulter Counter Multisizer 3" (a registered trademark, manufactured by Beckman Coulter, Inc.), a precision particle size distribution measuring apparatus by a pore electrical resistance method having an aperture tube of 100 $\mu$m and "Beckman Coulter Multisizer 3 Version 3.51" (prepared by Beckman Coulter, Inc.), an attached software for exclusive use for setting measuring conditions and analyzing measured data. Measurement was conducted with 25,000 channels as the number of the effectiveness measurement channels and calculation was performed on the basis of the analyzed measurement data.

As the electrolytic solution used in the measurement, an aqueous NaCl solution having a concentration of about 1 mass % is prepared by dissolving special-grade sodium chloride in ion-exchange water. For example, ISOTON R-II (available from Beckman Coulter, Inc.) may be used.

Setting of the exclusive software was performed as follows before conducting measurement and analysis.

The total number of counts in the control mode was set to 50,000 particles in the window for "changing the standard measurement method (SOM)" of the exclusive software and the number of measurement was set to "one time" and the Kd value was set to a value obtained by using "standard particle 10.0 $\mu$m" (manufactured by Beckman Coulter, Inc.). The threshold and noise levels were set automatically by pushing the measurement button of the threshold/noise level. In addition, the current was set to 1,600 $\mu$A, the gain was set to 2 and the electrolyte was set to ISOTON II and a check was entered in the flash of the aperture tube after measurement.

The particle size bin was set to 256 particle size bin and the bin interval was set to a logarithm particle size and the particle size range was set to from 2 $\mu$m to 60 $\mu$m in the window for "setting conversion from pulse to particle size" of the exclusive software.

Specific measuring method is as follows.

(1) About 200 ml of the above electrolyte aqueous solution is put in a 250 ml round bottom beaker made of glass for exclusive use of Multisizer 3 and the beaker is set in the sample stand and stirring of the stirrer rod is performed counterclockwise at 24 rotations per second. Contamination and air bubbles in the aperture tube are removed in advance using a function of an analysis software "flash of aperture".

(2) About 30 ml of the above electrolyte aqueous solution is put in a 100 ml flat bottom beaker made of glass, and thereto, about 0.3 ml of a liquid in which "Contaminon-N" (10 mass % aqueous solution of neutral detergent including a nonionic surfactant, an anion surfactant and an organic builder at pH 7 for use in cleaning an accurate measuring instrument, manufactured by Wako Pure Chemical Industries, Ltd.) is diluted three-fold by mass with ion-exchange water is added as a dispersant.

(3) A predetermined amount of ion-exchange water is added to a water tank of supersonic distributor "Ultrasonic Dispersion System Tetora 150" (manufactured by Nikkaki Bios Corporation) having two oscillators with an oscillatory frequency of 50 kHz built therein in a state that the phase thereof is shifted by 180 degrees and having an electric output of 120 W, and about 2 ml of the above Contaminon-N is added to this water tank.

(4) The beaker of the above (2) is set in a beaker holing hole of the above supersonic distributor and the supersonic distributor is operated. The vertical position of the beaker is adjusted so that the resonance condition of the liquid surface of the electrolyte aqueous solution in the beaker becomes maximal.

(5) About 10 mg of a toner is added and dispersed into the electrolyte aqueous solution in the beaker of the above (4) by small portions in the state that the electrolyte aqueous solution is irradiated with a supersonic wave. And the supersonic distribution treatment is continued for further 60 seconds. Here, the water temperature in the water tank is appropriately adjusted to from 10° C. to 40° C. during the supersonic distribution.

(6) The electrolyte aqueous solution of the above (5) having a toner dispersed therein is added dropwise to the round bottom beaker of the above (1) set up in the sample stand by means of a pipette so that the measurement concentration is adjusted to about 5%. And the measurement is performed till the number of particles measured amounts to 50,000.

(7) The measured data are analyzed with the above-mentioned exclusive software attached to the apparatus and the weight average particle size (D4) and the number average particle size (D1) are calculated. The "average diameter" of the analysis/volume statistical value (arithmetical average) window when the exclusive software is set to graph/volume % is the weight average particle size (D4), and the "average diameter" of the analysis/number statistical value (arithmetical average) window when the exclusive software is set to graph/number % is the number average particle size (D1).

(2) Measurement of Water Content

The water content in the present invention is defined as a value obtained by the following procedure. 5 g of the toner particle is taken on an aluminum plate, and precisely weighed (A [g]). It is allowed to stand in a dryer set to 105° C. for one hour and then precisely weighed (B [g]). The water content is a value calculated by the following formula.

$$\text{Water content}[\%] = ((A-B)/A) \times 100$$

(3) Evaluation of Image Performance/Fogging

A toner was obtained by externally adding 0.8 part by mass of hydrophobic silica having a specific surface area of 200 $m^2/g$ according to the BET method and 0.1 part by mass of titanium oxide having a specific surface area of 100 $m^2/g$ according to the BET method to 100.0 parts by mass of the toner particles obtained after drying. This toner was evaluated by using a modified machine in which in a full color laser beam printer (LBP-2510, manufactured by Canon Inc.), the process speed was changed to 120 mm/second.

In the first place, 100 g of the obtained toner was charged in a cartridge, and after performing idling as an accelerating test of toner degradation under a high temperature and high humidity condition (30° C., 80% RH) for two hours, an image printing test was carried out where an image pattern composed only of horizontal lines with a printing ratio of 2% was printed on 1,000 sheets, and thereby fogging in the non-image region was determined. Fogging was measured with REFLECTMETER MODEL TC-6DS manufactured by Tokyo Denshoku CO., LTD. A green filter was used and fogging was calculated by the following expression: fogging (reflectance) (%)=reflectance of standard paper−reflectance of nonimage area on sample.

Evaluation was made on fogging according to the following criteria.

A: Excellent (less than 1.5%)
B: Good (1.5% or more and less than 2.5%)
C: Normal (2.5% or more and less than 4.0%)
D: Poor (more than 4%)

EXAMPLES

In the following, the present invention is specifically described by way of examples.

[Production of Styrene Resin]

600.0 parts by mass of xylene was put in a reactor equipped with a dropping funnel, a Liebig condenser tube and a stirrer and the temperature was elevated to 135° C. A mixture of 100.0 parts by mass of styrene monomer, 0.1 part by mass of n-butylacrylate and 13.0 parts by mass of di-tert-butyl peroxide was charged in the dropping funnel and added dropwise to xylene at 135° C. for two hours. After solution polymerization was completed in a refluxing xylene (137° C. to 145° C.), xylene was removed to obtain a styrene resin. The obtained styrene resin had an weight average molecular weight (Mw) of 3200, a Mw/Mn ratio of 1.19 and a glass transition temperature (Tg) of 55° C.

Example 1

710 parts by mass of ion-exchange water and 850 parts by mass of 0.1 mol/liter $Na_3PO_4$ aqueous solution were added, and maintained at 60° C. with stirring at 4800 rpm using Clearmix (manufactured by M Technique). Thereto, 68 parts by mass of 1.0 mol/liter—$CaCl_2$ aqueous solution was gradually added to prepare an aqueous dispersive medium containing a minute water-insoluble dispersion stabilizing agent $Ca_3(PO_4)_2$.

A formulation including
124.0 parts by mass of styrene monomer,
36.0 parts by mass of N-butylacrylate,
13.0 parts by mass of copper phthalocyanine pigment,
40.0 parts by mass of the above-mentioned styrene resin,
10.0 parts by mass of a polyester resin
(Terephthalic acid—propylene oxide modified bispenol A (2 mol adduct)—ethylene oxide modified bispenol A (2 mol adduct) (molar ratio 51:30:20); Acid value 9, glass transition temperature 60° C., Mw=10,000, Mw/Mn=3.20),
0.8 parts by mass of E-88 (manufactured by Orient Chemical Industries, Ltd.), and
15.0 parts by mass of HNP-9 (manufactured by Nippon Seiro Corporation),
was warmed to 60° C. and uniformly dissolved and dispersed. 20.0 parts by mass of 1,1,3,3-tetramethylbutylperoxy 2-ethylhexanoate (50% toluene solution) as a polymerization initiator, were added to this to prepare a polymerizable monomer composition.

The polymerizable monomer composition mentioned above was placed in the above-mentioned aqueous dispersive medium and stirred at 60° C. in an $N_2$ atmosphere with Clearmix at 4800 rpm for 15 minutes and the polymerizable monomer mixture was granulated. Then, the inner temperature was elevated to 70° C. with stirring by means of a full zone mixing impeller (manufactured by Shinko Pantech Co., Ltd.) and reaction was carried out for six hours with slow stirring.

After the polymerization reaction was completed, saturated steam (pure steam/steam pressure 205 kPa/temperature 120° C.) was introduced while continuing stirring with a full zone mixing impeller. The temperature of the contents in the container reached 100° C. 20 minutes after the introduction of the saturated steam and distillate began to come out. Residual monomers were distilled off by obtaining a certain amount of distillate, followed by cooling to obtain a dispersion liquid of toner particles.

Calcium phosphate on the surface of the toner particles was dissolved by adding hydrochloric acid to the dispersion liquid of the toner particles, and the dispersion liquid of the toner particles was sent to a belt filter (manufactured by Tsukishima Kikai, Co. Ltd., synchro-filter modification type) equipped with a dehydrating apparatus of the embodiment illustrated in FIG. 2 while foaming was suppressed, and washed and dried under the following conditions to prepare a dehydrated toner particle cake.

<Dehydration and Washing Conditions of a Belt Filter Equipped with Dehydrating Apparatus>

Filtration area: 0.02 $m^2$
Slurry supplying rate: 180 kg/hr
Treatment time: treatment time (filter cloth halting time)/traveling time 75 sec/25 sec
Depressurization degree: −80 kPa
Cake washing liquid 19a: acid water (pH 1), 3 times the amount of the solid content in the supplied slurry
Cake washing liquid 19b: pure water (pH 6), 3 times the amount of the solid content in the supplied slurry
Cake washing apparatus 36c was not used.
Aeration gas pressure P1 (Compressed air): 300 kPa
Gas aeration time: 70 seconds Sealing time <Sealing member pressing time>: 72 seconds (a dehydrating apparatus was set up at the last span and sealed for 72 seconds of 75 seconds during which the belt was stopped in the last span.)

Shape of sealing unit and aeration unit: units in the embodiments illustrated in FIGS. 3, 4 and 5

Sealing unit lifting and lowering system: Air cylinder (Selex cylinder double-acting type manufactured by CKD Co., Ltd.)

Sealing member material: CR sponge (main ingredient: Polychloroprene)

Hardness 25°, independent cell structure

Thickness of sealing member after compression upstream/downstream: 15 mm (thickness of sealing member before compression: 60.0 mm)

The air cylinder was adjusted so that thickness of the sealing member after compression was 15 mm.

Sealing member compressibility: 75%

Distance K between lower surface of gas discharging part and top surface of horizontal level area of tray 35 mm Continuous operation time: 100 hr The thickness of the sealing member before compression at the point of time when treatment was carried out for consecutive 3 hours under the afore-mentioned conditions for dehydration and washing was 60.0 mm and the compressibility of the sealing member at the time of compression was 75%. The dehydrated toner particle cake after this dehydration and washing treatment for 3 hours was disintegrated and the water content was measured and found to be 19%.

In addition, at the point of time when consecutive 100-hour dehydration and washing treatment was carried out under the afore-mentioned conditions, the thickness of the sealing member before compression was distorted to 42.9 mm. Therefore the compressibility of sealing member was 65% when compressed to 15 mm. The dehydrated toner particle cake at the point of time when this dehydration and washing treatment was carried out for 100 hours was disintegrated and the water content was measured and found to be 23%. Then, the dehydrated toner particles thus disintegrated after the dehydration and washing treatment was carried out for 3 hours and 100 hours were flash dried respectively under the following conditions to obtain toner particles.

<Flash Dryer Drying Conditions>

Flash dryer (manufactured by SEISHIN ENTERPRISE CO., LTD.): A flash jet dryer: Pipe diameter 0.1016 m)

Blowing-in temperature: 90° C.
Blowing-in rate: 10 m$^3$/min
Dryer exit temperature: 40° C.
Supplying rate of wet toner particle: adjusted so that dryer exit temperature became 40° C.

The thus flash dried toner particles at the point of time when the dehydration and washing treatment was carried out for consecutive 3 hours had a weight average particle size (D4) of 5.8 μm and a water content of 0.20 mass %. The toner particles thus flash dried at the point of time when the treatment for dehydration and washing was carried out for consecutive 100 hours had a weight average particle size (D4) of 5.9 μm and a water content of 0.24 mass %. Furthermore, these toner particles subjected to drying treatment were evaluated according to the evaluation method of the image performance mentioned above. The results are shown in Table 1.

Example 2

The dehydrated toner particle cake prepared as in Example 1 was subjected to the dehydration and washing and drying treatments under the same manner as in Example 1 except that the distance K between the lower surface of the gas discharging part and the top surface of horizontal level area of the tray was changed to 400 mm to prepare toner particles. The thickness of the sealing member before compression at the point of time when the dehydration and washing treatment was carried out for consecutive 3 hours was 60.0 mm and the compressibility of the sealing member at the time of the compression was 75%. This dehydrated toner particle cake after the dehydration and washing treatment for 3 hours was disintegrated and the water content was measured and found to be 23%. At the point of time when consecutive 100-hour dehydration and washing treatment was carried out, the thickness of the sealing member before compression was distorted to 42.9 mm. Therefore, the compressibility was 65% when the sealing member was compressed to 15 mm. This dehydrated toner particle cake after the dehydration and washing for 100 hours treatment was carried out was disintegrated and the water content was measured and found to be 27%. The flash dried toner particles at the point of time when the dehydration and washing treatment for 3 hours had a weight average particle size (D4) of 5.9 μm and a water content of 0.24 mass %. The flash dried toner particles at the point of time when the dehydration and washing treatment was carried out for 100 hours had a weight average particle size (D4) of 5.9 μm and a water content of 0.27 mass %. These toner particles subjected to drying treatment were evaluated according to the evaluation method of the image performance mentioned above. The results are shown in Table 1.

Example 3

The dehydrated toner particle cake prepared as in Example 1 was subjected to the dehydration and washing and drying treatments under the same manner as in Example 1 except that the distance K between the lower surface of the gas discharging part and the top surface of horizontal level area of the tray was changed to 15 mm to prepare toner particles. The thickness of the sealing member before compression at the point of time when the dehydration and washing treatment was performed for consecutive 3 hours was 60.0 mm and the compressibility of the sealing member at the time of the compression was 75%. The dehydrated toner particle cake after this dehydration and washing treatment for 3 hours was disintegrated and the water content was measured and found to be 21%. At the point of time when the consecutive 100-hour dehydration and washing treatment was carried out, the thickness of the sealing member before compression was distorted to 42.9 mm. Therefore, the compressibility was 65% when the sealing member was compressed to 15 mm. This dehydrated toner particle cake after the dehydration and washing treatment for 100 hours was disintegrated and the water content was measured and found to be 25%. The flash dried toner particles at the point of time when the dehydration and washing treatment was carried out for 3 hours had a weight average particle size (D4) of 5.9 μm and a water content of 0.22 mass %. The flash dried toner particles at the point of time when the dehydration and washing treatment was carried out for 100 hours had a weight average particle size (D4) of 5.9 μm and a water content of 0.25 mass %. These toner particles subjected to drying treatment were evaluated according to the evaluation method of the image performance mentioned above. The results are shown in Table 1.

Example 4

The dehydrated toner particle cake prepared as in Example 1 was subjected to the dehydration and washing and drying treatments under the same conditions as in Example 1 except that the sealing unit and the aeration unit were changed to the units of the embodiment illustrated in FIGS. 7 and 8 to prepare toner particles. The thickness of the sealing member before compression at the point of time when the dehydration and washing treatment was performed for consecutive 3 hours was 60.0 mm and the compressibility of the sealing member at the time of the compression was 75%. This dehydrated toner particle cake after the dehydration and washing treatment for 3 hours was disintegrated and the water content measured was 20%. At the point of time when consecutive 100-hour dehydration and washing treatment was performed, the thickness of the sealing member before compression was distorted to 39.5 mm. Therefore, the compressibility was 62% when the sealing member was compressed to 15 mm. This dehydrated toner particle cake after the dehydration and washing treatment for 100 hours was disintegrated and the water content was measured and found to be 26%. The flash dried toner particles at the point of time when the dehydration and washing treatment was performed for 3 hours had a weight average particle size (D4) of 5.8 μm and a water content of 0.2 mass %. The flash dried toner particles at the point of time when the dehydration and washing treatment was performed for 100 hours had a weight average particle size (D4) of 5.9 μm and a water content of 0.25 mass %. These toner particles subjected to drying treatment were evaluated according to the evaluation method of the image performance mentioned above. The results are shown in Table 1.

Example 5

The dehydrated toner particle cake prepared as in Example 1 was subjected to the dehydration and washing and drying treatments under the same conditions as in Example 1 except that the sealing unit and the aeration unit were changed to the units of the embodiment illustrated in FIGS. 10 and 11 to prepare toner particles. The thickness of the sealing member before compression at the point of time when the dehydration and washing treatment was performed for consecutive 3 hours was 60.0 mm and the compressibility of the sealing member at the time of the compression was 75%. This dehydrated toner particle cake after the dehydration and washing treatment for 3 hours was disintegrated and the water content was measured and found to be 20%. At the point of time when consecutive 100-hour dehydration and washing treatment was performed, the thickness of the sealing member before compression was distorted to 35.7 mm. Therefore, the compressibility was 58% when the sealing member was compressed to 15 mm. This dehydrated toner particle cake after the dehydration and washing for 100 hours treatment was disintegrated and the water content measured was 26%. The flash dried toner particles at the point of time when the dehydration and washing treatment was performed for 3 hours had a weight average particle size (D4) of 5.8 μm and a water content of 0.20 mass %. The flash dried toner particles at the point of time when the dehydration and washing treatment was performed for 100 hours had a weight average particle size (D4) of 5.9 μm and a water content of 0.25 mass %. These toner particles subjected to drying treatment were evaluated according to the evaluation method of the image performance mentioned above. The results are shown in Table 1.

Example 6

The dehydrated toner particle cake prepared as in Example 1 was subjected to the dehydration and washing and drying treatments under the same conditions as in Example 1. Here, the pressure of the hydraulic cylinder was adjusted so that the thickness of the sealing member after the compression was 15 mm. The thickness of the sealing member before compression at the point of time when the dehydration and washing treatment was performed for consecutive 3 hours was 60.0 mm and the compressibility of the sealing member at the time of the compression was 75%. This dehydrated toner particle cake after the dehydration and washing treatment for 3 hours was disintegrated and the water content was measured and found to be 19%. At the point of time when consecutive 100-hour dehydration and washing treatment was carried out, the thickness of the sealing member before compression was distorted to 39.5 mm. Therefore, the compressibility was 62% when the sealing member was compressed to 15 mm. This dehydrated toner particle cake after the dehydration and washing treatment for 100 hours was disintegrated and the water content was measured and found to be 25%. The flash dried toner particles at the point of time when the dehydration and washing treatment was performed for 3 hours had a weight average particle size (D4) of 5.8 μm and a water content of 0.20 mass %. The flash dried toner particles at the point of time when the dehydration and washing treatment was conducted for 100 hours had a weight average particle size (D4) of 5.9 μm and a water content of 0.25 mass %. These toner particles subjected to drying treatment were evaluated according to the evaluation method of the image performance mentioned above. The results are shown in Table 1.

Example 7

The dehydrated toner particle cake prepared as in Example 1 was subjected to the dehydration and washing and drying treatments under the same conditions as in Example 1 except that the sealing unit lifting and lowering unit was changed to an air spring to prepare toner particles. Here, the inner pressure of the air spring was adjusted so that the thickness of the sealing member after the compression was 15 mm. The thickness of the sealing member before compression at the point of time when the dehydration and washing treatment was performed for consecutive 3 hours was 60.0 mm and the compressibility of the sealing member at the time of the compression was 75%. This dehydrated toner particle cake after the dehydration and washing treatment for 3 hours was disintegrated and the water content was measured and found to be 20%. At the point of time when consecutive 100-hour dehydration and washing treatment, the thickness of the sealing member before compression was distorted to 42.9 mm. Therefore, the compressibility was 65% when the sealing member was compressed to 15 mm. This dehydrated toner particle cake after the dehydration and washing treatment for 100 hours was disintegrated and the water content was measured and found to be 24%. The flash dried toner particles at the point of time when the dehydration and washing treatment was conducted for 3 hours had a weight average particle size (D4) of 5.8 μm and a water content of 0.20 mass %. The flash dried toner particles at the point of time when the dehydration and washing treatment was conducted for 100 hours had a weight average particle size (D4) of 5.9 μm and a water content of 0.24 mass %. These toner particles subjected to drying treatment were evaluated according to the evaluation method of the image performance mentioned above. The results are shown in Table 1.

Example 8

The dehydrated toner particle cake prepared as in Example 1 was subjected to the dehydration and washing and drying treatments under the same conditions as in Example 1 except that the sealing unit lifting and lowering unit was changed to a driving system using gears (system lifting and lowering the sealing unit using rack and pinion) to prepare toner particles. Here, the output of the motor connected to the pinion was adjusted so that the thickness of the sealing member after the compression was 15 mm. The thickness of the sealing member before compression at the point of time when the dehydration and washing treatment was conducted for consecutive 3 hours was 60.0 mm and the compressibility of the sealing member at the time of the compression was 75%. This dehydrated toner particle cake after the dehydration and washing treatment for 3 hours was disintegrated and the water content was measured and found to be 19%. At the point of time when consecutive 100-hour dehydration and washing treatment was conducted, the thickness of the sealing member before compression was distorted to 35.7 mm. Therefore, the compressibility was 58% when the sealing member was compressed to 15 mm. This dehydrated toner particle cake after the dehydration and washing treatment for 100 hours was disintegrated and the water content was measured and found to be 26%. The flash dried toner particles at the point of time when the dehydration and washing treatment was conducted for 3 hours had a weight average particle size (D4) of 5.8 µm and a water content of 0.20 mass %. The flash dried toner particles at the point of time when the dehydration and washing treatment was conducted for 100 hours had a weight average particle size (D4) of 5.9 µm and a water content of 0.25 mass %. These toner particles subjected to drying treatment were evaluated according to the evaluation method of the image performance mentioned above. The results are shown in Table 1.

Example 9

The dehydrated toner particle cake prepared as in Example 1 was subjected to the dehydration and washing and drying treatments under the same conditions as in Example 1 except that the pressure P1 of the gas fed from the aeration unit was 50 kPa to prepare toner particles. The thickness of the sealing member before compression at the time point when the dehydration and washing treatment was conducted for consecutive 3 hours was 60.0 mm and the compressibility of the sealing member at the time of the compression was 75%. This dehydrated toner particle cake after the dehydration and washing treatment for 3 hours was disintegrated and the water content was measured and found to be 29%. At the point of time when consecutive 100-hour dehydration and washing treatment was conducted, the thickness of the sealing member before compression was distorted to 42.9 mm. Therefore, the compressibility was 65% when the sealing member was compressed to 15 mm. This dehydrated toner particle cake after the dehydration and washing treatment for 100 hours was disintegrated and the water content was measured and found to be 32%. The flash dried toner particles at the point of time when the dehydration and washing was conducted for 3 hours had a weight average particle size (D4) of 6.0 µm and a water content of 0.3 mass %. The flash dried toner particles at the point of time when the dehydration and washing treatment was conducted for 100 hours had a weight average particle size (D4) of 6.1 µm and a water content of 0.33 mass %. These toner particles subjected to drying treatment were evaluated according to the evaluation method of the image performance mentioned above. The results are shown in Table 1.

Example 10

The dehydrated toner particle cake prepared as in Example 1 was subjected to the dehydration and washing and drying treatments under the same conditions as in Example 1 except that the pressure P1 of the gas fed from the aeration unit was 700 kPa to prepare toner particles. The thickness of the sealing member before compression when the dehydration and washing treatment was conducted for consecutive 3 hours was 60.0 mm and the compressibility of the sealing member at the time of the compression was 75%. This dehydrated toner particle cake after the dehydration and washing treatment for 3 hours was disintegrated and the water content was measured and found to be 23%. At the point of time when consecutive 100-hour dehydration and washing treatment was conducted, the thickness of the sealing member before compression was distorted to 42.9 mm. Therefore, the compressibility was 65% when the sealing member was compressed to 15 mm. This dehydrated toner particle cake after the dehydration and washing treatment for 100 hours was disintegrated and the water content was measured and found to be 27%. The flash dried toner particles at the point of time when the dehydration and washing treatment was conducted for 3 hours had a weight average particle size (D4) of 5.9 µm and a water content of 0.24 mass %. The flash dried toner particles at the point of time when the dehydration and washing treatment was conducted for 100 hours had a weight average particle size (D4) of 5.9 µm and a water content of 0.27 mass %. These toner particles subjected to drying treatment were evaluated according to the evaluation method of the image performance mentioned above. The results are shown in Table 1.

Example 11

The dehydrated toner particle cake prepared as in Example 1 was subjected to the dehydration and washing and drying treatments under the same conditions as in Example 1 except that the sealing member was a CR sponge having a hardness of 50° and an independent cell structure to prepare toner particles. The thickness of the sealing member before compression at the time point when the dehydration and washing treatment was conducted for consecutive 3 hours was 60.0 mm and the compressibility of the sealing member at the time of the compression was 75%. This dehydrated toner particle cake after the dehydration and washing treatment for 3 hours was disintegrated and the water content was measured and found to be 24%. At the point of time when consecutive 100-hour dehydration and washing treatment was conducted, the thickness of the sealing member before compression was distorted to 30 mm. Therefore, the compressibility was 50% when the sealing member was compressed to 15 mm. This dehydrated toner particle cake after the dehydration and washing treatment for 100 hours was disintegrated and the water content was measured and found to be 30%. The flash dried toner particles at the point of time when the dehydration and washing treatment was conducted for 3 hours had a weight average particle size (D4) of 5.9 µm and a water content of 0.24 mass %. The flash dried toner particles at the point of time when the dehydration and washing treatment was conducted for 100 hours had a weight average particle size (D4) of 6.0 µm and a water content of 0.3 mass %. These toner particles subjected to drying treatment were evaluated according to the evaluation method of the image performance mentioned above. The results are shown in Table 2.

Example 12

The dehydrated toner particle cake prepared as in Example 1 was subjected to the dehydration and washing and drying treatments under the same conditions as in Example 1 except that the sealing member was a urethane foam having a hardness of 5° and an open cell structure to prepare toner particles. The thickness of the sealing member before compression at the time point when the dehydration and washing treatment was conducted for consecutive 3 hours was 60.0 mm and the compressibility of the sealing member at the time of the compression was 75%. This dehydrated toner particle cake after the dehydration and washing treatment for 3 hours was disintegrated and the water content was measured and found to be 23%. At the point of time when consecutive 100-hour dehydration and washing treatment was conducted, the thickness of the sealing member before compression was distorted to 50 mm. Therefore, the compressibility was 70% when the sealing member was compressed to 15 mm. This dehydrated toner particle cake after the treatment of dehydration and washing for 100 hours was disintegrated and the water content was measured and found to be 25%. The flash dried toner particles at the point of time when the dehydration and washing treatment was conducted for 3 hours had a weight average particle size (D4) of 5.9 μm and a water content of 0.24 mass %. In the meantime, the flash dried toner particles at the point of time the dehydration and washing treatment was conducted for 100 hours had a weight average particle size (D4) of 5.9 μm and a water content of 0.25 mass %. These toner particles subjected to drying treatment were evaluated according to the evaluation method of the image performance mentioned above. The results are shown in Table 2.

Example 13

The dehydrated toner particle cake prepared as in Example 1 was subjected to the dehydration and washing and drying treatments under the same conditions as in Example 1 except that the sealing member was a urethane foam having a hardness of 20° and a semi-open cell structure to prepare toner particles. The thickness of the sealing member before compression at the time point when the dehydration and washing treatment was conducted for consecutive 3 hours was 60.0 mm and the compressibility of the sealing member at the time of the compression was 75%. This dehydrated toner particle cake after the dehydration and washing treatment for 3 hours was disintegrated and the water content was measured and found to be 17%. At the point of time when consecutive 100-hour dehydration and washing treatment was conducted, the thickness of the sealing member before compression was distorted to 57.7 mm. Therefore, the compressibility was 74% when the sealing member was compressed to 15 mm. This dehydrated toner particle cake after the dehydration and washing treatment for 100 hours was disintegrated and the water content was measured and found to be 19%. The flash dried toner particles at the point of time when the dehydration and washing treatment was conducted for 3 hours had a weight average particle size (D4) of 5.8 μm and a water content of 0.16 mass %. The flash dried toner particles at the point of time when the dehydration and washing treatment was conducted for 100 hours had a weight average particle size (D4) of 5.8 μm and a water content of 0.20 mass %. These toner particles subjected to drying treatment were evaluated according to the evaluation method of the image performance mentioned above. The results are shown in Table 2.

Example 14

The dehydrated toner particle cake prepared as in Example 1 was subjected to the dehydration and washing and drying treatments under the same conditions as in Example 1 to prepare toner particles except that the sealing member was a urethane foam having a hardness of 20° and a semi-open cell structure and that an air cylinder pressure was adjusted so that the thickness of the sealing member on the upstream side when compressed was 15 mm and the thickness of the sealing member on the downstream side when compressed was 9 mm. The thickness of the sealing member before compression at the time point when the dehydration and washing treatment was conducted for consecutive 3 hours was 60.0 mm on both the upstream and downstream sides and the compressibility of the sealing member at the time of the compression was respectively 75% and 85%. This dehydrated toner particle cake after the dehydration and washing treatment for 3 hours was disintegrated and the water content measured was 16%. At the point of time when consecutive 100-hour dehydration and washing treatment was conducted, the thickness of the sealing member before compression was distorted to 57.7 mm on the upstream side and 56.3 mm on the downstream side. Therefore, the compressibility of the sealing member when compressed was respectively 74% and 84%. This dehydrated toner particle cake after the dehydration and washing treatment for 100 hours was disintegrated and the water content was measured and found to be 18%. The flash dried toner particles at the point of time when the dehydration and washing treatment was conducted for 3 hours had a weight average particle size (D4) of 5.8 μm and a water content of 0.15 mass %. The flash dried toner particles at the point of time when the dehydration and washing treatment was conducted for 100 hours had a weight average particle size (D4) of 5.8 μm and a water content of 0.18 mass %. These toner particles subjected to drying treatment were evaluated according to the evaluation method of the image performance mentioned above. The results are shown in Table 2.

Example 15

The dehydrated toner particle cake prepared as in Example 1 was subjected to the dehydration and washing and drying treatments under the same conditions as in Example 1 except that the sealing member was a CR sponge having a hardness of 5° and an independent cell structure to prepare toner particles. The thickness of the sealing member before compression at the time point when the dehydration and washing treatment was conducted for consecutive 3 hours was 60.0 mm and the compressibility of the sealing member at the time of the compression was 75%. This dehydrated toner particle cake after the dehydration and washing treatment for 3 hours was disintegrated and the water content measured was 23%. At the point of time when consecutive 100-hour dehydration and washing treatment was conducted, the thickness of the sealing member before compression was distorted to 33.3 mm. Therefore, the compressibility was 55% when the sealing member was compressed to 15 mm. This dehydrated toner particle cake after the dehydration and washing treatment for 100 hours was disintegrated and the water content was measured to be 29%. The flash dried toner particles at the point of time when the dehydration and washing treatment was conducted for 3 hours had a weight average particle size (D4) of 5.9 μm and a water content of 0.24 mass %. The flash dried toner particles at the point of time when the dehydration and washing treatment was conducted for 100 hours had a weight average particle size (D4) of 6.0 μm and a water content of 0.3 mass %. These toner particles subjected to drying treatment were evaluated according to the evaluation method of the image performance mentioned above. The results are shown in Table 2.

Example 16

5 parts by mass of $Na_3PO_4 \cdot 12H_2O$ was placed in 332 parts by mass of ion-exchange water and after warmed to 60° C., stirred at 3500 rpm using Clearmix (manufactured by M Technique). Thereto, 27 parts by mass of 1.0 mol/liter—CaCl$_2$ aqueous solution was added to prepare an aqueous medium containing Ca$_3$(PO$_4$)$_2$.

- 70 parts by mass of styrene monomer
- 30 parts by mass of n-butylacrylate
- 80 parts by mass of magnetic material treated with a silane coupling agent obtained by the following preparation method
- 10.0 parts by mass of a polyester resin (Terephthalic acid—propylene oxide modified bispenol A (2 mol adduct)—ethylene oxide modified bispenol A (2 mol adduct) (molar ratio 51:30:20); Acid value 9, glass transition temperature 60° C., Mw=10,000, Mw/Mn=3.20)
- 0.8 parts by mass of E-88 (manufactured by Orient Chemical Industries, Ltd.)
- 15.0 parts by mass of HNP-9 (manufactured by Nippon Seiro Co., Ltd.)

The above formulation was warmed to 60° C. and uniformly dissolved and dispersed. Thereto, 20.0 parts by mass of 1,1,3,3-tetramethylbutylperoxy 2-ethylhexanoate (50% toluene solution), a polymerization initiator, were added to prepare a polymerizable monomer composition.

<Preparation of Magnetic Material>

In a ferrous sulfate aqueous solution, 1.0 to 1.1 equivalent of a sodium hydroxide solution based on iron element, 1.5 mass % of sodium hexametaphosphate in terms of phosphorus element based on iron element, and 1.5 mass % of sodium silicate in terms of silicon element based on iron element were mixed to prepare an aqueous solution containing ferrous hydroxide.

While this aqueous solution was kept to pH 9, air was blown into the solution, and oxidation reaction was carried out at 80° C. to 90° C. to prepare slurry from which seed crystals were to be formed.

Next, to this slurry, a ferrous sulfate aqueous solution was added so as to be 0.9 to 1.2 equivalents based on the initial alkali amount (sodium component of sodium hydroxide). Thereafter, while the slurry was kept to pH 8, air was blown into the slurry, during which the oxidation reaction was allowed to proceed, obtaining a slurry containing magnetic iron oxide. This slurry was filtered and washed. Then, this water-containing slurry was re-dispersed in a different aqueous medium. Thereafter, the pH of the re-dispersion liquid was adjusted to about 4.5, and, with thorough stirring, n-hexyltrimethoxysilane was added thereto in an amount of 2.0 parts by mass based on 100 parts by mass of the magnetic iron oxide, to carry out hydrolysis. Thereafter, the pH of the dispersion liquid was adjusted to about 10, where condensation reaction was carried out and coupling treatment was carried out. The hydrophobic magnetic fine particles thus formed were washed, filtered and dried by conventional methods, and the resultant particles were subjected to disintegration treatment. The magnetic fine particles thus obtained had a volume average particle size of 0.20 µm.

The polymerizable monomer composition mentioned above was placed in the above-mentioned aqueous dispersive medium and stirred at 60° C. in an N$_2$ atmosphere by means of Clearmix at 4800 rpm for 15 minutes and the polymerizable monomer mixture was granulated.

Then, the inner temperature was elevated to 70° C. with stirring by means of a full zone mixing impeller (manufactured by Shinko Pantech Co., Ltd.) and the mixture was reacted for six hours with slow stirring.

After the polymerization reaction was completed, saturated steam (pure steam/steam pressure 205 kPa/temperature 120° C.) was introduced while stirring was continued using a full zone mixing impeller. The temperature of contents in the container reached 100° C. 20 minutes later after introduction of the saturated steam and distillate began to come out. Residual monomer was distilled off by obtaining a certain amount of distillate, followed by cooling to obtain a dispersion liquid of the toner particles.

After calcium phosphate on the surface of the toner particles was dissolved by adding hydrochloric acid to the dispersion liquid of the toner particles, the dispersion liquid was sent to a belt filter (manufactured by Tsukishima Kikai, Co. Ltd., synchro-filter modification type) equipped with a dehydrating apparatus of the embodiment illustrated in FIG. 2 while foaming was suppressed, and washed and dried under the following conditions to produce a dehydrated toner particle cake.

<Dehydration and Washing Conditions of a Belt Filter Equipped with Dehydrating Apparatus>

Filtration area: 0.02 m$^2$

Slurry supplying rate: 180 kg/hr

Treatment time: treatment time (filter cloth halting time)/traveling time 75 sec/25 sec Depressurization degree: −80 kPa Cake washing liquid 19$a$: acid water (pH 1), 3 times the amount of the solid content in the supplied slurry Cake washing liquid 19$b$: pure water (pH 6), 3 times the amount of the solid content in the supplied slurry Cake washing apparatus 36$c$ was not used.

Aeration gas pressure P1 (Compressed air): 300 kPa

Gas aeration time: 70 seconds

Sealing time <Sealing member pressing time>: 72 seconds (a dehydrating apparatus was set up at the last span and sealed for 72 seconds of 75 seconds during which the belt was stopped in the last span.)

Shape of sealing unit and aeration unit: units in the embodiments illustrated in FIGS. 3, 4 and 5

Sealing unit lifting and lowering system: Air cylinder (Selex cylinder double-acting type manufactured by CKD Co., Ltd.)

Sealing member material: CR sponge (main ingredient: Polychloroprene)

Hardness 25°, independent cell structure

Thickness of sealing member after compression upstream/downstream: 15 mm (thickness of sealing member before compression: 60.0 mm)

The air cylinder was adjusted so that thickness of the sealing member after compression was 15 mm.

Sealing member compressibility: 75%

Distance K between lower surface of gas discharging part and top surface of horizontal level area of tray: 35 mm Continuous operation time: 100 hr The thickness of the sealing member before compression at the time point when the dehydration and washing treatment under the conditions mentioned above for consecutive 3 hours was 60.0 mm and the compressibility of the sealing member at the time of the compression was 75%. The dehydrated toner particle cake at the point of time when this dehydration and washing treatment was conducted for 3 hours was disintegrated and the water content was measured and found to be 17%. In addition, at the point of time when consecutive 100-hour dehydration and washing treatment was conducted under the conditions mentioned above, the thickness of the sealing member before compression was distorted to 42.9 mm. Therefore the compressibility of sealing member was 65% when compressed to 15 mm. The dehydrated toner particle cake at the point of time when this dehydration and washing treatment was conducted for 100 hours was disintegrated and the water content was measured and found to be 21%. Then, the disintegrated dehydrated toner particles after the dehydration and washing treatment was conducted for 3 hours and 100 hours were flash dried respectively under the following conditions to obtain toner particles.

<Flash Dryer Drying Condition>
Flash dryer (manufactured by SEISHIN ENTERPRISE CO., LTD.): A flash jet dryer: Pipe diameter 0.1016 m)
Blowing-in temperature: 90° C.
Blowing-in rate: 10 m³/min
Dryer exit temperature: 40° C.
Supplying rate of wet toner particle: adjusted so that dryer exit temperature became 40° C.

The dried toner particles at the point of time when the dehydration and washing treatment was conducted for consecutive 3 hours had a weight average particle size (D4) of 5.8 μm and a water content of 0.15 mass %. The thus dried toner particles at the point of time when the dehydration and washing treatment was conducted for consecutive 100 hours had a weight average particle size (D4) of 5.9 μm and a water content of 0.18 mass %. These toner particles subjected to drying treatment were evaluated according to the evaluation method of the image performance mentioned above. The results are shown in Table 2.

Example 17

The dehydrated toner particle cake prepared as in Example 1 was subjected to the dehydration and washing and drying treatments under the same conditions as in Example 13 except that a filter cloth 23 is provided between the sealing unit 6 and the wet toner particle cake 1 as illustrated in FIGS. 17 and 18 to prepare toner particles. Here, the material of the filter cloth was polyester and the aeration rate was 1.0 cm³/cm²·sec. The thickness of the sealing member before compression at the time point when the dehydration and washing treatment was conducted for consecutive 3 hours was 60.0 mm and the compressibility of the sealing member at the time of the compression was 75%. This dehydrated toner particle cake after the dehydration and washing treatment for 3 hours was disintegrated and the water content was measured and found to be 18%. At the point of time when consecutive 100-hour dehydration and washing treatment was conducted, the thickness of the sealing member before compression was distorted to 57.7 mm. Therefore, the compressibility was 74% when the sealing member was compressed to 15 mm. This dehydrated toner particle cake after the dehydration and washing treatment for 100 hours was disintegrated and the water content was measured and found to be 18%. The flash dried toner particles at the point of time when the dehydration and washing treatment was conducted for 3 hours had a weight average particle size (D4) of 5.8 μm and a water content of 0.18 mass %. The flash dried toner particles at the point of time when the dehydration and washing treatment was conducted for 100 hours had a weight average particle size (D4) of 5.8 μm and a water content of 0.18 mass %. These toner particles subjected to drying treatment were evaluated according to the evaluation method of the image performance mentioned above. The results are shown in Table 2.

Example 18

The dehydrated toner particle cake prepared as in Example 1 was subjected to the dehydration and washing and drying treatments under the same conditions as in Example 13 except that a filter cloth 23 is provided between the sealing unit 6 and the wet toner particle cake 1 as illustrated in FIGS. 17 and 18 to prepare toner particles. Here, the material of the filter cloth 23 was polypropylene and the aeration rate was 12 cm³/cm²·sec. The thickness of the sealing member before compression at the time point when the dehydration and washing treatment was conducted for consecutive 3 hours was 60.0 mm and the compressibility of the sealing member at the time of the compression was 75%. This dehydrated toner particle cake after the dehydration and washing treatment for 3 hours was disintegrated and the water content was measured and found to be 17%. At the point of time when consecutive 100-hour dehydration and washing treatment was conducted, the thickness of the sealing member before compression was distorted to 57.7 mm. Therefore, the compressibility was 74% when the sealing member was compressed to 15 mm. This dehydrated toner particle cake after the dehydration and washing treatment for 100 hours was disintegrated and the water content measured was 17%. The flash dried toner particles at the point of time when the dehydration and washing treatment was conducted for 3 hours had a weight average particle size (D4) of 5.8 μm and a water content of 0.16 mass %. The flash dried toner particles at the point of time when the dehydration and washing treatment was conducted for 100 hours had a weight average particle size (D4) of 5.8 μm and a water content of 0.16 mass %. These toner particles subjected to drying treatment were evaluated according to the evaluation method of the image performance mentioned above. The results are shown in Table 2.

Comparative Example 1

The dehydrated toner particle cake prepared as in Example 1 was subjected to the washing and drying treatments under the same conditions as in Example 1 to prepare toner particles except that the dehydration apparatus was not used. The wet toner particle cake after the washing treatment for consecutive 3 hours was disintegrated and the water content measured was 42%. The wet toner particle cake after the treatment of washing for consecutive 100 hours was disintegrated and the water content was measured and found to be 42%. The flash dried toner particles at the point of time when the washing treatment was conducted for 3 hours had a weight average particle size (D4) of 6.2 μm and a water content of 0.4 mass %. The flash dried toner particles at the point of time when the washing treatment was conducted for 100 hours had a weight average particle size (D4) of 6.2 μm and a water content of 0.4 mass %. These toner particles subjected to drying treatment were evaluated according to the evaluation method of the image performance mentioned above. The results are shown in Table 3.

Comparative Example 2

The dehydrated toner particle cake prepared as in Example 16 was subjected to the washing and drying treatments under the same conditions as in Example 16 to prepare toner particles except that the dehydration apparatus was not used. The wet toner particle cake after the washing treatment for consecutive 3 hours was disintegrated and the water content was measured and found to be 35%. The wet toner particle cake after the washing treatment for consecutive 100 hours was disintegrated and the water content was measured and found to be 35%. The flash dried toner particles at the point of time when the washing treatment was conducted for 3 hours had a weight average particle size (D4) of 6.1 μm and a water content of 0.35 mass %. The flash dried toner particles at the point of time when the washing treatment was conducted for 100 hours had a weight average particle size (D4) of 6.1 μm and a water content of 0.35 mass %. These toner particles subjected to drying treatment were evaluated according to the evaluation method of the image performance mentioned above. The results are shown in Table 3.

Comparative Example 3

Toner particles were prepared under the same manner as in Example 1 except that the dehydrating apparatus used was a dehydrating apparatus of the embodiment illustrated in FIG. 15 and the apparatus was operated under the conditions shown below.

Figure 15:
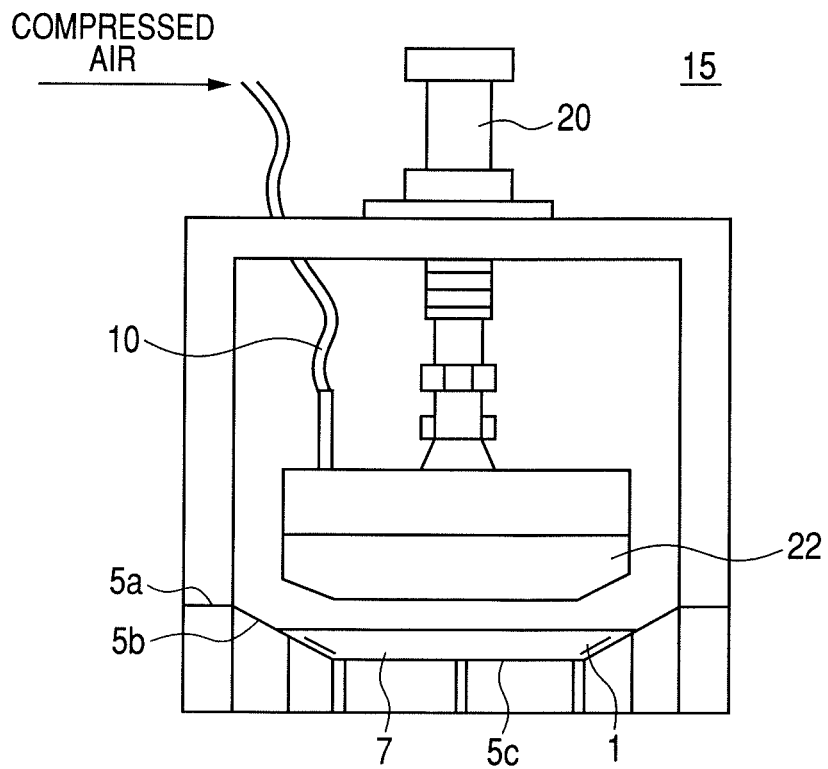
FIG. 15 illustrates a dehydrating apparatus (pressurization/aeration part) for conventional belt filters.
Figure 16:
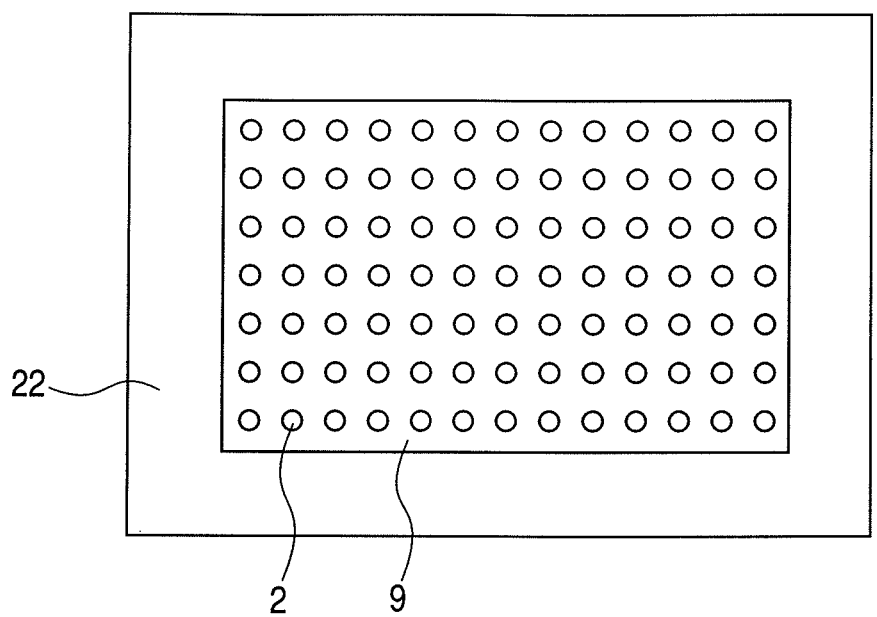
FIG. 16 is a schematic view illustrating the dehydrating apparatus (pressurization/aeration part) of FIG. 15 from below.

<Dehydration and Washing Conditions of a Belt Filter Equipped with Dehydrating Apparatus of Embodiment Illustrated in FIG. 15>

Filtration area: 0.02 m²
Slurry supplying rate: 180 kg/hr
Treatment time: treatment time (filter cloth halting time)/traveling time 75 sec/25 sec
Depressurization degree: −80 kPa
Cake washing liquid 19a: acid water (pH 1), 3 times the amount of the solid content in the supplied slurry
Cake washing liquid 19b: pure water (pH 6), 3 times the amount of the solid content in the supplied slurry
Cake washing apparatus 36c was not used.
Aeration gas pressure (Compressed air): 300 kPa
Gas aeration time: 70 seconds
Sealing time <Dehydrating apparatus lowering time>: 72 seconds (a dehydrating apparatus was set up at the last span and sealed for 72 seconds of 75 seconds during which the belt was stopped in the last span.)
Sealing unit lifting and lowering unit: hydraulic
Sealing member material: CR sponge (main ingredient: Polychloroprene)
Hardness 25° independent cell structure
Thickness of sealing member after compression: 15 mm (thickness of sealing member before compression 60.0 mm)

The hydraulic cylinder was adjusted so that thickness of the sealing member after compression was 15 mm.
Sealing member compressibility: 75%
Continuous operation time: 100 hr The thickness of the sealing member before compression at the time point when the dehydration and washing treatment was carried out for consecutive 3 hours was 60.0 mm and the compressibility of the sealing member at the time of the compression was 75%. The dehydrated toner particle cake at the point of time when this dehydration and washing treatment was conducted for 3 hours was disintegrated and the water content measured was 23%.

In addition, at the point of time when consecutive 100-hour dehydration and washing treatment of, the thickness of the sealing member before compression was distorted to 23.1 mm. Therefore the compressibility of sealing member was 35% when compressed to 15 mm. The sealing member was examined at this point of time and it was found that the parts with which the slope parts of the vacuum tray was pressed significantly deteriorated. The dehydrated toner particle cake at the point of time when this dehydration and washing treatment was conducted for 100 hours was disintegrated and the water content was measured and found to be 37%.

The flash dried toner particles at the point of time when the dehydration and washing treatment was conducted for 3 hours had a weight average particle size (D4) of 5.9 μm and a water content of 0.25 mass %. The flash dried toner particles at the point of time when the dehydration and washing treatment was conducted for consecutive 100 hours had a weight average particle size (D4) of 6.2 μm and a water content of 0.4 mass %.

These toner particles subjected to drying treatment were evaluated according to the evaluation method of the image performance mentioned above. The results are shown in Table 3.

TABLE 1

|  | Example 1 | | Example 2 | | Example 3 | | Example 4 | | Example 5 | |
| --- | --- | --- | --- | --- | --- | --- | --- | --- | --- | --- |
| Aeration unit and sealing unit | Unit in embodiment illustrated in FIGS. 3 and 4 | | Unit in embodiment illustrated in FIGS. 3 and 4 | | Unit in embodiment illustrated in FIGS. 3 and 4 | | Unit in embodiment illustrated in FIGS. 7 and 8 | | Unit in embodiment illustrated in FIGS. 10 and 11 | |
| Sealing material | CR sponge Independent cell | | CR sponge Independent cell | | CR sponge Independent cell | | CR sponge Independent cell | | CR sponge Independent cell | |
| Hardness of sealing material (°) | 25 | | 25 | | 25 | | 25 | | 25 | |
| Driving mechanism of sealing unit | Air cylinder | | Air cylinder | | Air cylinder | | Air cylinder | | Air cylinder | |
| Aeration gas pressure P1 (kPa) | 300 | | 300 | | 300 | | 300 | | 300 | |
| Distance K (mm) | 35 | | 400 | | 15 | | 35 | | 35 | |
| Filter cloth (between wet toner particle cake and sealing unit) | Not used | | Not used | | Not used | | Not used | | Not used | |
| Toner type | Non-magnetic | | Non-magnetic | | Non-magnetic | | Non-magnetic | | Non-magnetic | |
| Operation time (hr) | 3 | 100 | 3 | 100 | 3 | 100 | 3 | 100 | 3 | 100 |
| Compressibility of sealing unit (%) | 75 | 65 | 75 | 65 | 75 | 65 | 75 | 62 | 75 | 58 |
| Water content of toner particle cake after dehydration (%) | 19 | 23 | 23 | 27 | 21 | 25 | 20 | 26 | 20 | 26 |
| Water content of toner particle after drying (%) | 0.2 | 0.24 | 0.24 | 0.27 | 0.22 | 0.25 | 0.2 | 0.25 | 0.2 | 0.25 |
| Weight average toner particle size after drying (D4) (μm) | 5.8 | 5.9 | 5.9 | 5.9 | 5.9 | 5.9 | 5.8 | 5.9 | 5.8 | 5.9 |

TABLE 1-continued

|  | | | | | | | | | | |
|---|---|---|---|---|---|---|---|---|---|---|
| Evaluation of photographic fogging | A | B | B | C | B | B | A | B | A | B |
| Photographic fogging (%) | 1.3 | 1.9 | 1.9 | 2.6 | 1.5 | 2.3 | 1.4 | 2.3 | 1.4 | 2.3 |

|  | Example 6 | | Example 7 | | Example 8 | | Example 9 | | Example 10 | |
|---|---|---|---|---|---|---|---|---|---|---|
| Aeration unit and sealing unit | Unit in embodiment illustrated in FIGS. 3 and 4 | | Unit in embodiment illustrated in FIGS. 3 and 4 | | Unit in embodiment illustrated in FIGS. 3 and 4 | | Unit in embodiment illustrated in FIGS. 3 and 4 | | Unit in embodiment illustrated in FIGS. 3 and 4 | |
| Sealing material | CR sponge Independent cell | | CR sponge Independent cell | | CR sponge Independent cell | | CR sponge Independent cell | | CR sponge Independent cell | |
| Hardness of sealing material (°) | 25 | | 25 | | 25 | | 25 | | 25 | |
| Driving mechanism of sealing unit | Hydraulic | | Air spring | | Gears | | Air cylinder | | Air cylinder | |
| Aeration gas pressure P1 (kPa) | 300 | | 300 | | 300 | | 50 | | 700 | |
| Distance K (mm) | 35 | | 35 | | 35 | | 35 | | 35 | |
| Filter cloth (between wet toner particle cake and sealing unit) | Not used | | Not used | | Not used | | Not used | | Not used | |
| Toner type | Non-magnetic | | Non-magnetic | | Non-magnetic | | Non-magnetic | | Non-magnetic | |
| Operation time (hr) | 3 | 100 | 3 | 100 | 3 | 100 | 3 | 100 | 3 | 100 |
| Compressibility of sealing unit (%) | 75 | 62 | 75 | 65 | 75 | 58 | 75 | 65 | 75 | 65 |
| Water content of toner particle cake after dehydration (%) | 19 | 25 | 20 | 24 | 19 | 26 | 29 | 32 | 23 | 27 |
| Water content of toner particle after drying (%) | 0.2 | 0.25 | 0.2 | 0.24 | 0.2 | 0.25 | 0.3 | 0.33 | 0.24 | 0.27 |
| Weight average toner particle size after drying (D4) (μm) | 5.8 | 5.9 | 5.8 | 5.9 | 5.8 | 5.9 | 6 | 6.1 | 5.9 | 5.9 |
| Evaluation of photographic fogging | A | B | A | B | A | B | C | C | B | C |
| Photographic fogging (%) | 1.3 | 2.3 | 1.4 | 2.1 | 1.3 | 2.4 | 3.3 | 3.9 | 1.9 | 2.6 |

TABLE 2

|  | Example 11 | | Example 12 | | Example 13 | | Example 14 | |
|---|---|---|---|---|---|---|---|---|
| Aeration unit and sealing unit | Unit in embodiment illustrated in FIGS. 3 and 4 | | Unit in embodiment illustrated in FIGS. 3 and 4 | | Unit in embodiment illustrated in FIGS. 3 and 4 | | Unit in embodiment illustrated in FIGS. 3 and 4 | |
| Sealing material | CR sponge Independent cell | | Urethane foam Open cell | | Urethane foam Semi-open cell | | Urethane foam Semi-open cell | |
| Hardness of sealing material (°) | 50 | | 5 | | 20 | | 20 | |
| Driving mechanism of sealing unit | Air cylinder | | Air cylinder | | Air cylinder | | Air cylinder | |
| Aeration gas pressure P1 (kPa) | 300 | | 300 | | 300 | | 300 | |
| Distance K (mm) | 35 | | 35 | | 35 | | 35 | |
| Filter cloth (between wet toner particle cake and sealing unit) | Not used | | Not used | | Not used | | Not used | |
| Toner type | Non-magnetic | | Non-magnetic | | Non-magnetic | | Non-magnetic | |
| Operation time (hr) | 3 | 100 | 3 | 100 | 3 | 100 | 3 | 100 |
| Compressibility of sealing unit (%) | 75 | 50 | 75 | 70 | 75 | 74 | Upstream 75 Downstream 85 | Upstream 74 Downstream 84 |
| Water content of toner particle cake after dehydration (%) | 24 | 30 | 23 | 25 | 17 | 19 | 16 | 18 |
| Water content of toner particle after drying (%) | 0.24 | 0.3 | 0.24 | 0.25 | 0.16 | 0.2 | 0.15 | 0.18 |
| Weight average toner particle size after drying (D4) (μm) | 5.9 | 6 | 5.9 | 5.9 | 5.8 | 5.8 | 5.8 | 5.8 |
| Evaluation of photographic fog | B | C | B | B | A | A | A | A |
| Photographic fog (%) | 2.1 | 3.5 | 1.9 | 2.3 | 1.1 | 1.3 | 1 | 1.2 |

TABLE 2-continued

|  | Example 15 | | Example 16 | | Example 17 | | Example 18 | |
| --- | --- | --- | --- | --- | --- | --- | --- | --- |
| Aeration unit and sealing unit | Unit in embodiment illustrated in FIGS. 3 and 4 | | Unit in embodiment illustrated in FIGS. 3 and 4 | | Unit in embodiment illustrated in FIGS. 3 and 4 | | Unit in embodiment illustrated in FIGS. 3 and 4 | |
| Sealing material | CR sponge Independent cell | | CR sponge Independent cell | | Urethane foam Semi-open cell | | Urethane foam Semi-open cell | |
| Hardness of sealing material (°) | 5 | | 25 | | 20 | | 20 | |
| Driving mechanism of sealing unit | Air cylinder | | Air cylinder | | Air cylinder | | Air cylinder | |
| Aeration gas pressure Pl (kPa) | 300 | | 300 | | 300 | | 300 | |
| Distance K (mm) | 35 | | 35 | | 35 | | 35 | |
| Filter cloth (between wet toner particle cake and sealing unit) | Not used | | Not used | | Used Polyester | | Used Polypropylene | |
| Toner type | Non-magnetic | | Magnetic | | Non-magnetic | | Non-magnetic | |
| Operation time (hr) | 3 | 100 | 3 | 100 | 3 | 100 | 3 | 100 |
| Compressibility of sealing unit (%) | 75 | 55 | 75 | 65 | 75 | 74 | 75 | 74 |
| Water content of toner particle cake after dehydration (%) | 23 | 29 | 17 | 21 | 18 | 18 | 17 | 17 |
| Water content of toner particle after drying (%) | 0.24 | 0.3 | 0.15 | 0.18 | 0.18 | 0.18 | 0.16 | 0.16 |
| Weight average toner particle size after drying (D4) (μm) | 5.9 | 6 | 5.8 | 5.9 | 5.8 | 5.8 | 5.8 | 5.8 |
| Evaluation of photographic fog | B | C | A | B | A | A | A | A |
| Photographic fog (%) | 1.9 | 3.3 | 1 | 1.5 | 1.2 | 1.3 | 1.1 | 1.2 |

TABLE 3

|  | Comparative Example 1 | | Comparative Example 2 | | Comparative Example 3 | |
| --- | --- | --- | --- | --- | --- | --- |
| Aeration unit and sealing unit | — | | — | | Apparatus in embodiment illustrated in FIG. 15 | |
| Sealing material | — | | — | | CR sponge Independent cell | |
| Hardness of sealing material (°) | — | | — | | 25 | |
| Driving mechanism of sealing unit | — | | — | | Hydraulic cylinder | |
| Aeration gas pressure Pl (kPa) | — | | — | | 300 | |
| Distance K (mm) | — | | — | | Aeration surface is closely contacted with cake | |
| Filter cloth (between wet toner particle cake and sealing unit) | — | | — | | Not used | |
| Toner type | Non-magnetic | | Magnetic | | Non-magnetic | |
| Operation time (hr) | 3 | 100 | 3 | 100 | 3 | 100 |
| Compressibility of sealing unit (%) | — | — | — | — | 75 | 35 |
| Water content of toner particle cake after dehydration (%) | 42 | 42 | 35 | 35 | 23 | 37 |
| Water content of toner particle after drying (%) | 0.4 | 0.4 | 0.35 | 0.35 | 0.25 | 0.4 |
| Weight average toner particle size after drying (D4) (μm) | 6.2 | 6.2 | 6.1 | 6.1 | 5.9 | 6.2 |
| Evaluation of photographic fog | D | D | D | D | B | D |
| Photographic fog (%) | 6.8 | 6.8 | 5.5 | 5.5 | 1.9 | 5.1 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-054895, filed Mar. 5, 2008, which is hereby incorporated by reference herein in its entirety.

What is claimed is:

1. A filter cloth traveling type belt filter for removing water from a toner particle cake by aeration, the belt filter comprising:
   a filter cloth;
   a tray including a horizontal surface and an end; and
   a dehydrating apparatus having an aeration unit and sealing units,
   wherein the belt filter has a constitution in which the filter cloth travels between the tray and the aeration unit,
   wherein the aeration unit has a gas discharging part, and is provided opposite to the tray with a gap therebetween, and both ends of the aeration unit and the tray in a direction orthogonal to a traveling direction of the filter cloth are sealed with a static sealing member,
   wherein the sealing units are provided at an upstream side and a downstream side of the aeration unit in the traveling direction of the filter cloth, and are connected to respective driving units so as to advance to and retreat from the filter cloth,
   wherein the sealing units form a space with the aeration unit, the static sealing member, and a toner particle cake on the filter cloth when the sealing units are advanced to the filter cloth on which the toner particle cake exists and in the space, a gas ejected from the gas discharging part of the aeration unit is accumulated for the aeration of the toner particle cake on the filter cloth, and
   wherein the static sealing member statically seals the end of the tray directly to the aeration unit in a direction orthogonal to the traveling direction of the filter cloth.

2. The filter cloth traveling type belt filter according to claim 1, wherein the tray is a vacuum tray which can be evacuated from below the filter cloth.

3. The filter cloth traveling type belt filter according to claim 1, wherein the aeration unit has a buffer room for accumulating gas for aeration provided above the gas discharging part.

4. The filter cloth traveling type belt filter according to claim 1, wherein the gas discharging part has perforations and discharges gas from the perforations.

5. The filter cloth traveling type belt filter according to claim 1, wherein the aeration unit is fixed so that K is within the range of $15 \leq K \leq 400$, wherein K (mm) is a distance between the lower surface of the gas discharging part and the upper surface of the horizontal level of the tray below the filter cloth.

6. The filter cloth traveling type belt filter according to claim 1, wherein the belt filter is an intermittently traveling type belt filter.

7. The filter cloth traveling type belt filter according to claim 6, wherein operation of the sealing units is in conjunction with intermittent travel of the intermittently traveling type belt filter.

8. A process of preparing toner particles comprising the step of removing water from a toner particle cake with a filter cloth traveling type belt filter according to claim 1.

9. The filter cloth traveling type belt filter according to claim 1, wherein the sealing units contact and press the toner particle cake on the filter cloth.

* * * * *